(12) United States Patent
Matsumoto

(10) Patent No.: US 8,155,038 B2
(45) Date of Patent: Apr. 10, 2012

(54) WIRELESS COMMUNICATION APPARATUS AND WIRELESS COMMUNICATION METHOD USING BLUETOOTH

(75) Inventor: Hiroaki Matsumoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 618 days.

(21) Appl. No.: 12/337,047

(22) Filed: Dec. 17, 2008

(65) Prior Publication Data
US 2009/0161602 A1    Jun. 25, 2009

(30) Foreign Application Priority Data
Dec. 21, 2007  (JP) ................. 2007-331091

(51) Int. Cl.
*H04B 7/00* (2006.01)
(52) U.S. Cl. ........................................ 370/310
(58) Field of Classification Search .......... None
See application file for complete search history.

(56) References Cited

U.S. PATENT DOCUMENTS

| | | | | |
|---|---|---|---|---|
| 7,016,336 B2* | 3/2006 | Sorensen | .................. | 370/351 |
| 7,231,179 B2* | 6/2007 | Karusawa | .................. | 455/41.2 |
| 7,289,821 B2* | 10/2007 | Kim et al. | .................. | 455/512 |
| 2003/0219002 A1* | 11/2003 | Kishida | .................. | 370/338 |
| 2004/0142690 A1* | 7/2004 | Eom et al. | .................. | 455/436 |
| 2004/0156318 A1* | 8/2004 | Rune et al. | .................. | 370/235 |
| 2005/0002372 A1* | 1/2005 | Rune et al. | .................. | 370/346 |

FOREIGN PATENT DOCUMENTS

| | | |
|---|---|---|
| JP | 2003-152736 | 5/2003 |
| JP | 2003-309541 | 10/2003 |

* cited by examiner

*Primary Examiner* — Chi Pham
*Assistant Examiner* — Fan Ng
(74) *Attorney, Agent, or Firm* — Turocy & Watson, LLP

(57) ABSTRACT

A wireless communication apparatus which is capable of communicating with a first wireless terminal holding a first data packet by Bluetooth includes a search unit, a first transceiver transmitting, a first controller, and a scheduling unit. The search unit reserves a search, and executing the search. The first transceiver transmits the first and second control packets, and receives the first data packet and a second data packet. The first controller reserves a transmission of the second control packet to the first wireless terminal, the first controller giving instructions to transmit the second control packet to the first transceiver. The scheduling unit accepts the reservation from the first controller and the search unit, the scheduling unit preferentially allowing a transmission of the second control packet compared with the search, and allowing the search when no reservation of the transmission of the second control packet is made.

17 Claims, 12 Drawing Sheets

Wireless communication system (piconet)

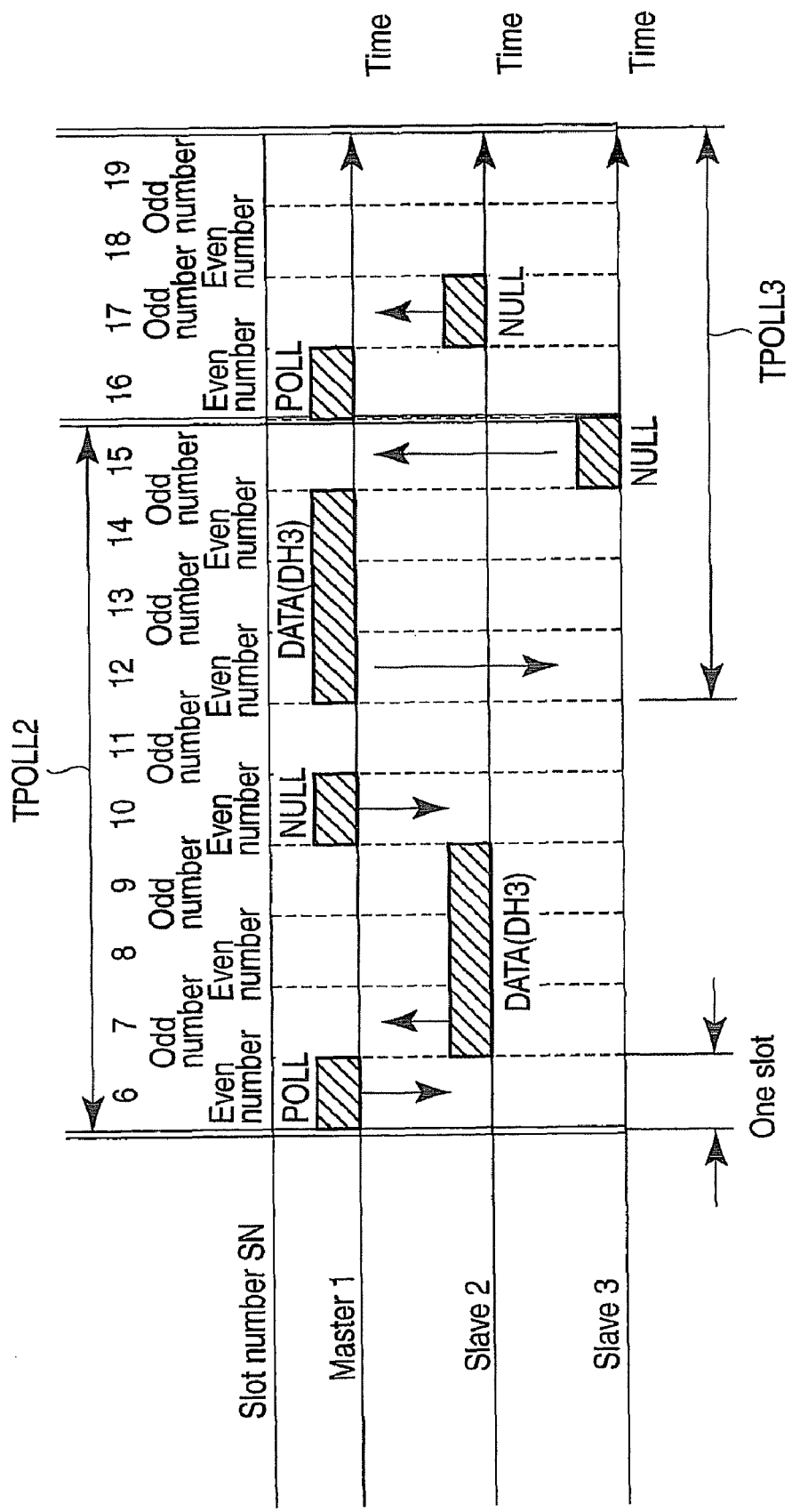
F I G. 6

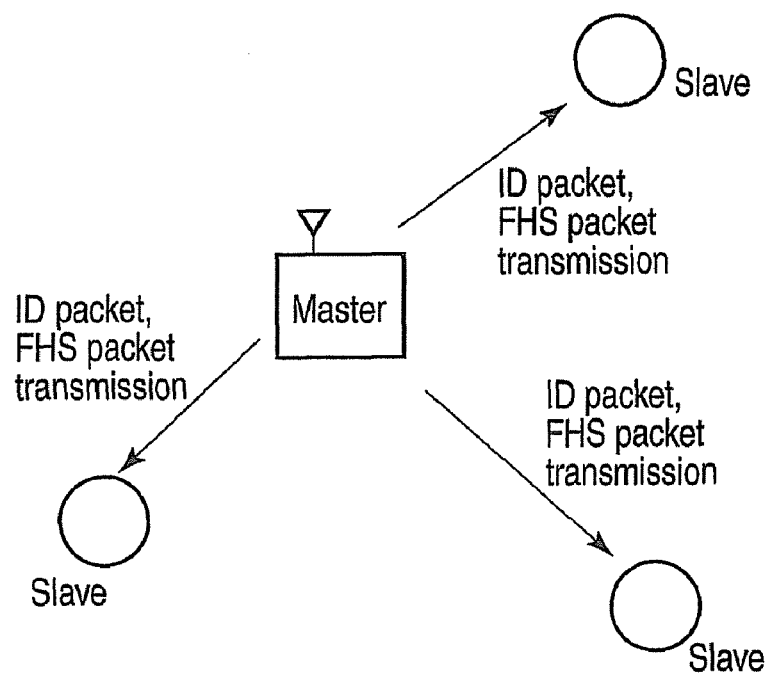
F I G. 1 0
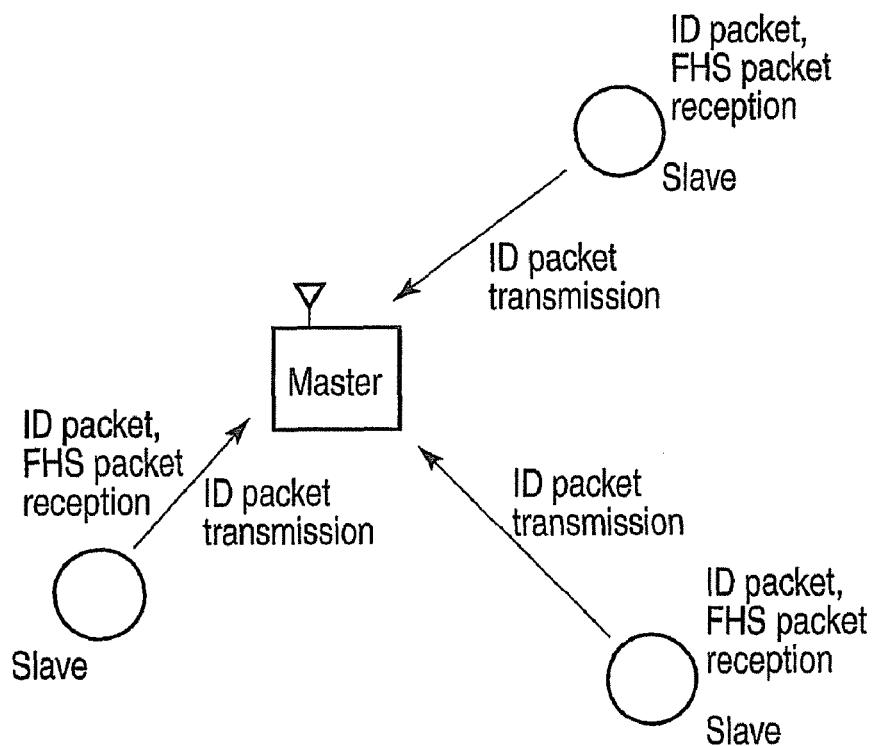
F I G. 1 1

| Priority | Executed processing |
|---|---|
| 1 | POLL packet transmission for each TPOLL to slave requiring streaming |
| 2 | POLL packet transmission for each TPOLL to slave requiring no streaming |
| 3 | NULL packet transmission to slave requiring streaming |
| 4 | Search and connection of slave by inquiry, inquiry scan, page, page scan processings |
| 5 | NULL packet transmission for each TPOLL to slave requiring no streaming |

FIG. 12

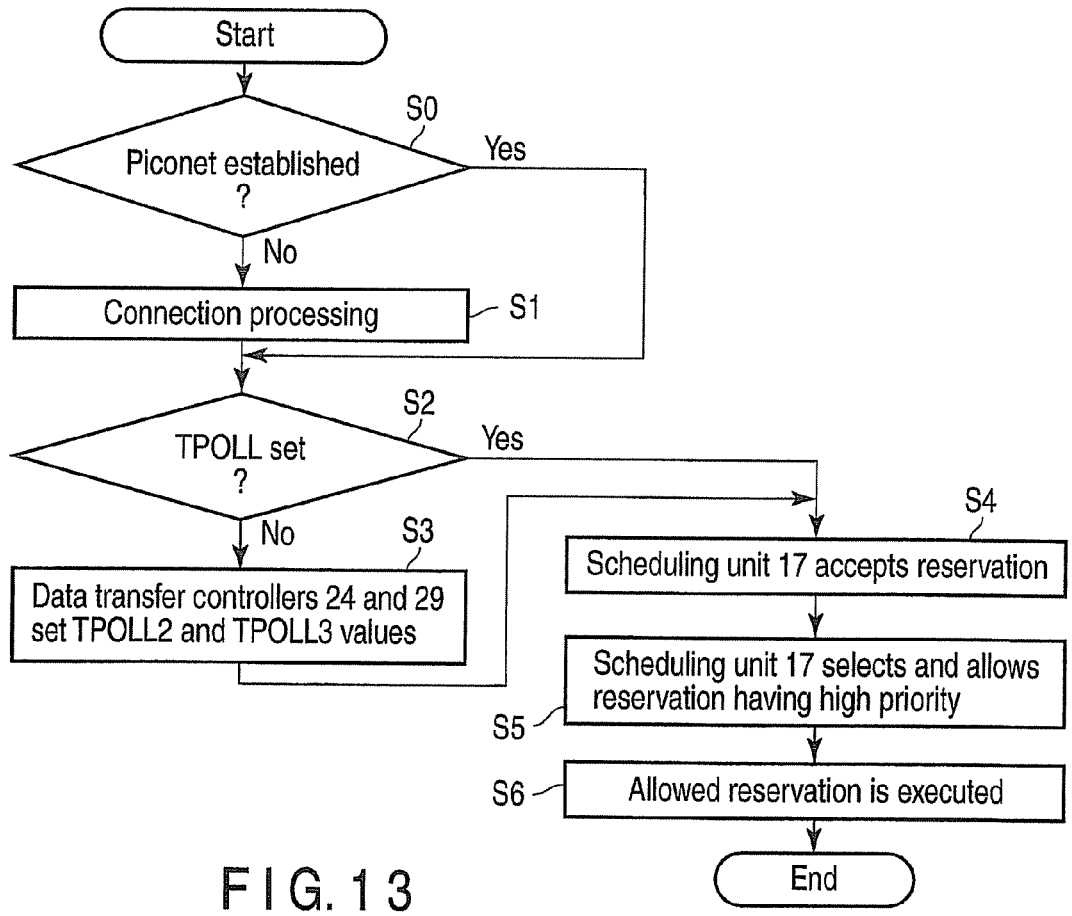

FIG. 13

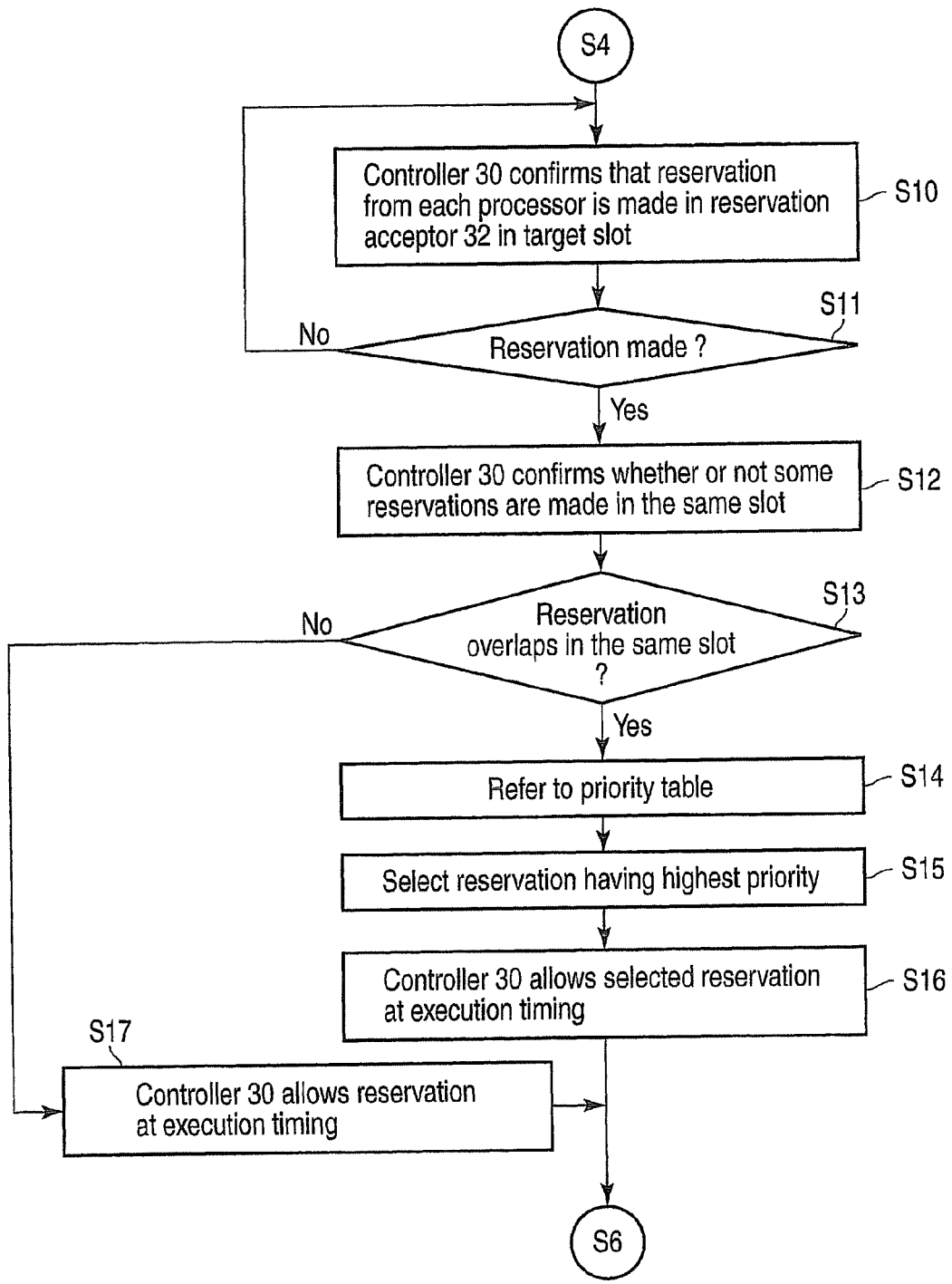
F I G. 14

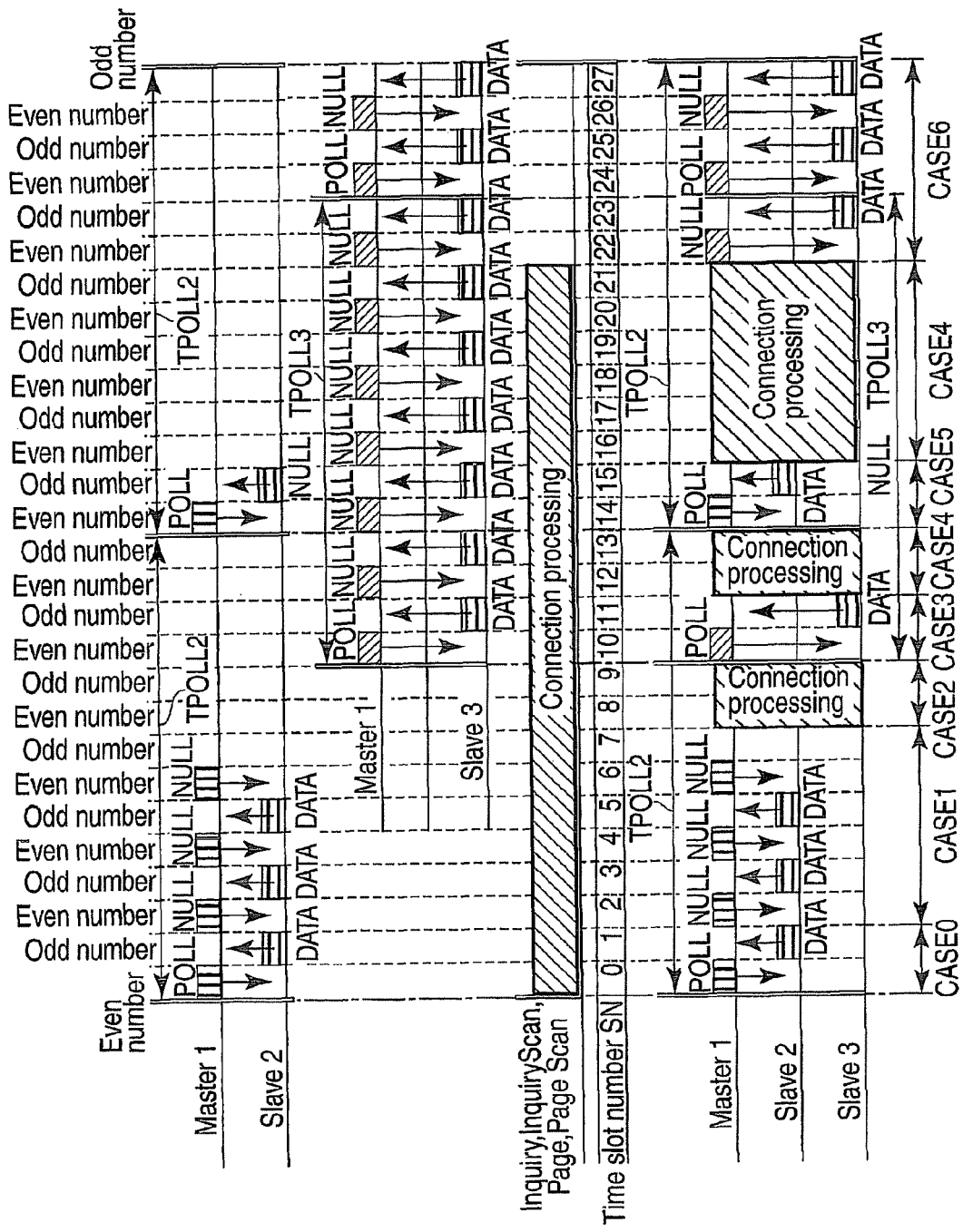

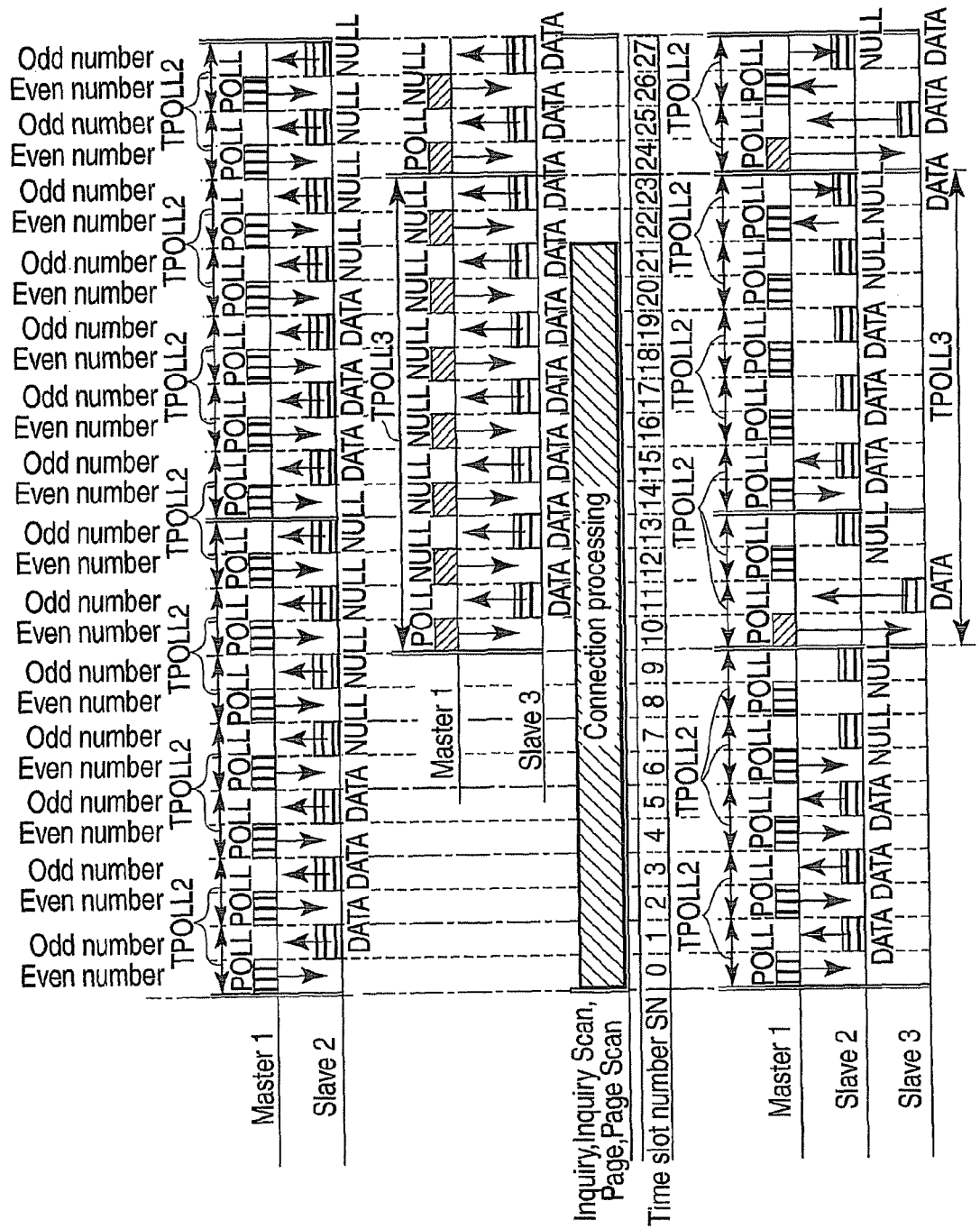
F I G. 17A
F I G. 17B
F I G. 17C
F I G. 17D

WIRELESS COMMUNICATION APPARATUS AND WIRELESS COMMUNICATION METHOD USING BLUETOOTH

CROSS-REFERENCE TO RELATED APPLICATIONS

This application is based upon and claims the benefit of priority from prior Japanese Patent Application No. 2007-331091, filed Dec. 21, 2007, the entire contents of which are incorporated herein by reference.

BACKGROUND OF THE INVENTION

1. Field of the Invention

The present invention relates to wireless communication apparatus and method. For example, the present invention relates to a method of effectively transferring non-streaming data in addition to real-time data.

2. Description of the Related Art

According to Bluetooth (trademark), home electrical appliances are simply connected without using electric cords so that they make wireless communications with each other. The foregoing Bluetooth is given as one of short-distance wireless data communication technical standards published by Bluetooth SIG (Special Interest Group).

For example, audio data transfer from an audio player to a car stereo is given as communication using the Bluetooth. In this case, the communication using the Bluetooth requires real-time processing for reproducing the audio data. In other words, streaming technique is required.

Conventionally, the following two methods have been employed. According to one method, streaming is executed in accordance with a transmission line condition. If the transmission line condition is worsened, data to be transferred is securely transferred in a state of being much less compressed. According to another method, relatively needless packets are deleted in data transfer. The foregoing methods are disclosed in Jpn. Pat. Appln. KOKAI Publications No. 2003-309541 and 2003-152736. Preferentially, data is continuously received from the data original device rather than searching for and connecting to other devices having a Bluetooth function. Actually, the priority of executing the search and connection processing to other devices having a Bluetooth function is set higher than continuous data reception from the data original device. Previously considering the case where the transmission line condition is worsened, many chances of data transfer are given to the data original device. In this way, data is continuously received from the data original device, and further, data retransmissions are repeated.

BRIEF SUMMARY OF THE INVENTION

A wireless communication apparatus which is capable of communicating with a first wireless terminal holding a first data packet by Bluetooth, includes:

a search unit reserving a search of a second wireless terminal different from the first wireless terminal, and executing the search when the reservation is allowed;

a first transceiver transmitting the first and second control packets to the first wireless terminal, and receiving the first data packet and a second data packet following the first data packet from the first wireless terminal, the first control packet transmitted from the first transceiver giving a notification of a transfer start of the first data packet, the second control packet giving a notification of a transfer start of the second data packet;

a first controller reserving a transmission of the second control packet to the first wireless terminal, the first controller giving instructions to transmit the second control packet to the first transceiver when the transmission of the second control packet is allowed; and a scheduling unit accepting the reservation from the first controller and the search unit, the scheduling unit preferentially allowing a transmission of the second control packet compared with the search, and allowing the search when no reservation of the transmission of the second control packet is made.

A wireless communication method according to an aspect of the present invention includes:

causing a second wireless terminal having a control function with respect to a first wireless terminal to transmit a first control packet to the first wireless terminal referring to a priority table holding a transmission priority order for each kind of the packet to be transmitted to the first wireless terminal, the first control packet being a packet for receiving a first data packet from the first wireless terminal making Bluetooth communications;

causing the first wireless terminal to transmit the first data packet to the second wireless terminal in response to the first control packet;

causing the second wireless terminal to further transmit a second control packet for receiving a second data packet to the first wireless terminal according to the priority table after receiving the first data packet; and causing the second wireless terminal to search a third wireless terminal according to the priority table after the reception of the first data packet from the first wireless terminal ends.

BRIEF DESCRIPTION OF THE SEVERAL VIEWS OF THE DRAWING

FIG. 6 is a conceptual view showing data transmitted and received in the wireless communication system according to one embodiment of the invention;

FIGS. 8 to 11 are conceptual views to explain a connection processing in the wireless communication system according to one embodiment of the invention;

FIG. 12 is a table showing the priority according to one embodiment of the invention;

FIG. 13 is a flowchart to explain the procedure by a scheduling unit according to one embodiment of the invention;

FIGS. 14 and 15 are flowcharts to explain the operation by a wireless communication system according to one embodiment of the invention;

FIG. 16A and FIG. 17A are conceptual views showing data transmitted and received in the wireless communication system according to one embodiment of the invention, and show the data transfers that a master 1 prefers against slave 2;

FIG. 16B and FIG. 17B are conceptual views showing data transmitted and received in the wireless communication system according to one embodiment of the invention, and show the data transfers that a master 1 prefers against slave 3;

FIG. 16C and FIG. 17C are conceptual views showing data transmitted and received in the wireless communication system according to one embodiment of the invention, and show an operation that a connection processor 13 of a master 1 requests a connection processing; and FIG. 16D and FIG. 17D are conceptual views showing data transmitted and received in the wireless communication system according to one embodiment of the invention, and show a state of the procedure actually allowed an executed by a controller 30.

DETAILED DESCRIPTION OF THE INVENTION

One embodiment of the invention will be hereinafter described with reference to the accompanying drawings.

Figure 1:
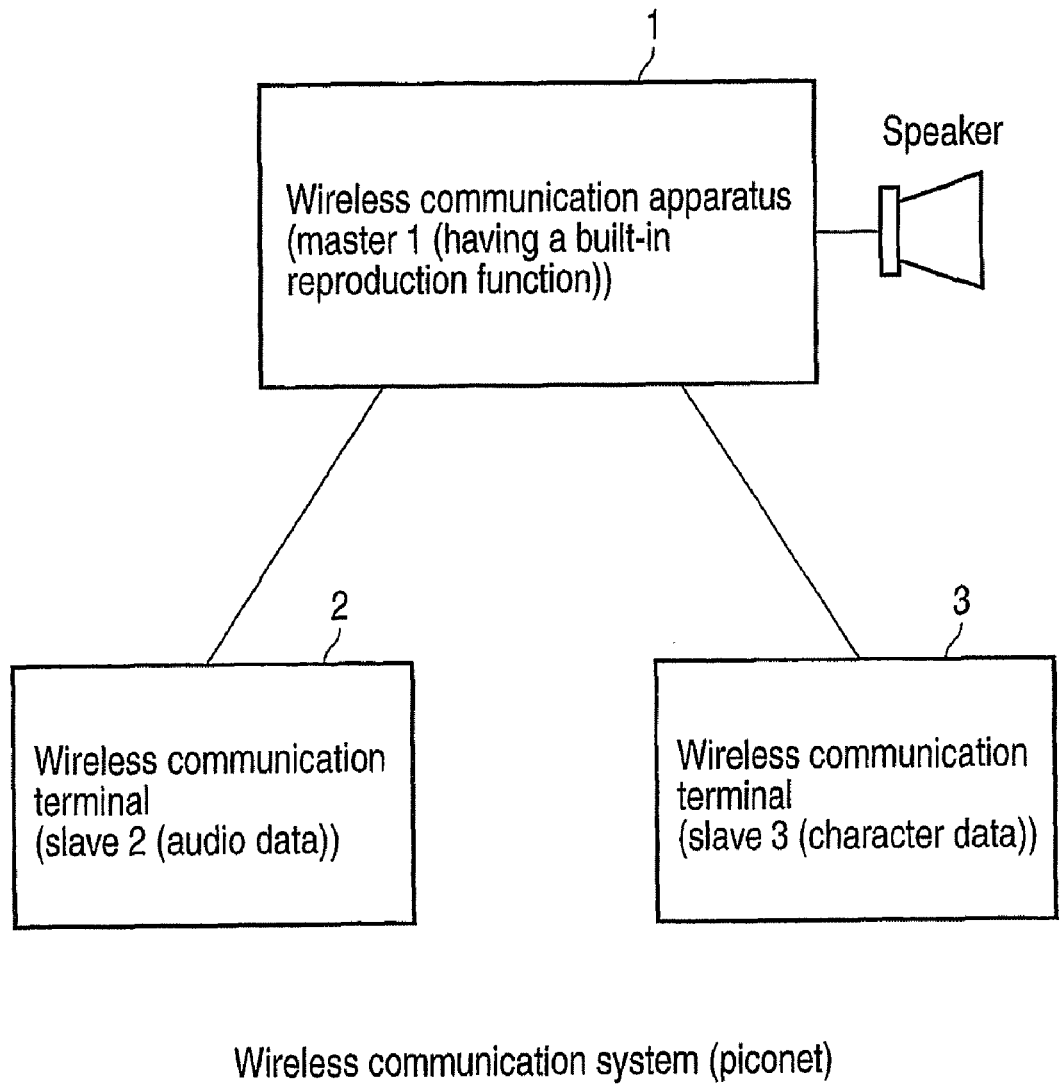
FIG. 1 and FIG. 2 are block diagrams showing the configuration of a wireless communication system according to one embodiment of the invention.

Wireless communication system and method according to one embodiment of the invention will be described below with reference to FIG. 1. FIG. 1 is a conceptual view showing the configuration of a wireless communication system according to this embodiment, and shows a wireless communication system conformable to a Bluetooth standard.

<Configuration of Piconet>

As shown in FIG. 1, a wireless communication system 1 includes a wireless communication apparatus 1 and wireless communication terminals 2 and 3. The wireless communication apparatus 1 receives a plurality of wireless communication terminals 2 and 3 to form a wireless communication system conformable to the Bluetooth standard. According to this embodiment, the wireless communication system is connected with the wireless communication apparatus 1 in an ad hoc mode to form a network. The foregoing network is called a Piconet in the Bluetooth standard. In the wireless communication system, an ad hoc mode communication means the following mode of communication. According to the mode of communication, communications are made between terminals without requiring an access point such as a wireless base station. The foregoing ad hoc mode communication is called an independent basic service set (IBBS) in the IEEE 802.11 standard.

The wireless communication apparatus 1 of FIG. 1 is an apparatus having a control function with respect to the wireless communication terminals 2 and 3 received in the Piconet. The apparatus 1 is hereinafter referred to as a master 1.

The wireless communication terminals 2 and 3 of FIG. 1 are apparatuses, which are operated according to instructions from the master 1, and hereinafter, referred to as slave. In other words, the slave means apparatuses except the apparatus (master 1) having a control function. The slave acquires a clock of the master in the belonging Piconet, and calculates offset with a clock of the slave, and thereby, takes synchronization with the master. Thus, the slave transfers data according to the clock of the master. FIG. 1 of this embodiment shows the case where the wireless communication terminal included in the Piconet is two. But, it is defined that the number of the wireless communication terminals can be up to seven in maximum. This is because information recognizing the master and the slave included in data exchanged in the Piconet comprises 3 bits. One Piconet has seven slaves to the maximum; therefore, wireless communications are made between eight apparatuses including the master to the maximum. The data format transmitted and received in the Piconet will be described later.

According to the Bluetooth standard communication, data held by the slave 2 is transferred to the slave 3, for example. In this case, the data of slave 2 is transferred to the slave 3 via the master 1. Likewise, communications are made via the master 1 in the case where data held by the slave 3 is transferred to the slave 2.

Namely, when data is transferred between slaves 2 and 3 in the Piconet, a data exchange is always made via the master 1. This is because the master 1 controls all of the data transfer in the Piconet.

Each function of the master 1, slaves 2 and 3 in the Piconet is always exchangeable. Usually, the function each of the master and the slave is assigned when the Piconet is formed. In this case, even if the master is ridded of the Piconet, the apparatus functioning as the slave so far is changed to be the master, and thereby, a new Piconet is formed.

Figure 2:
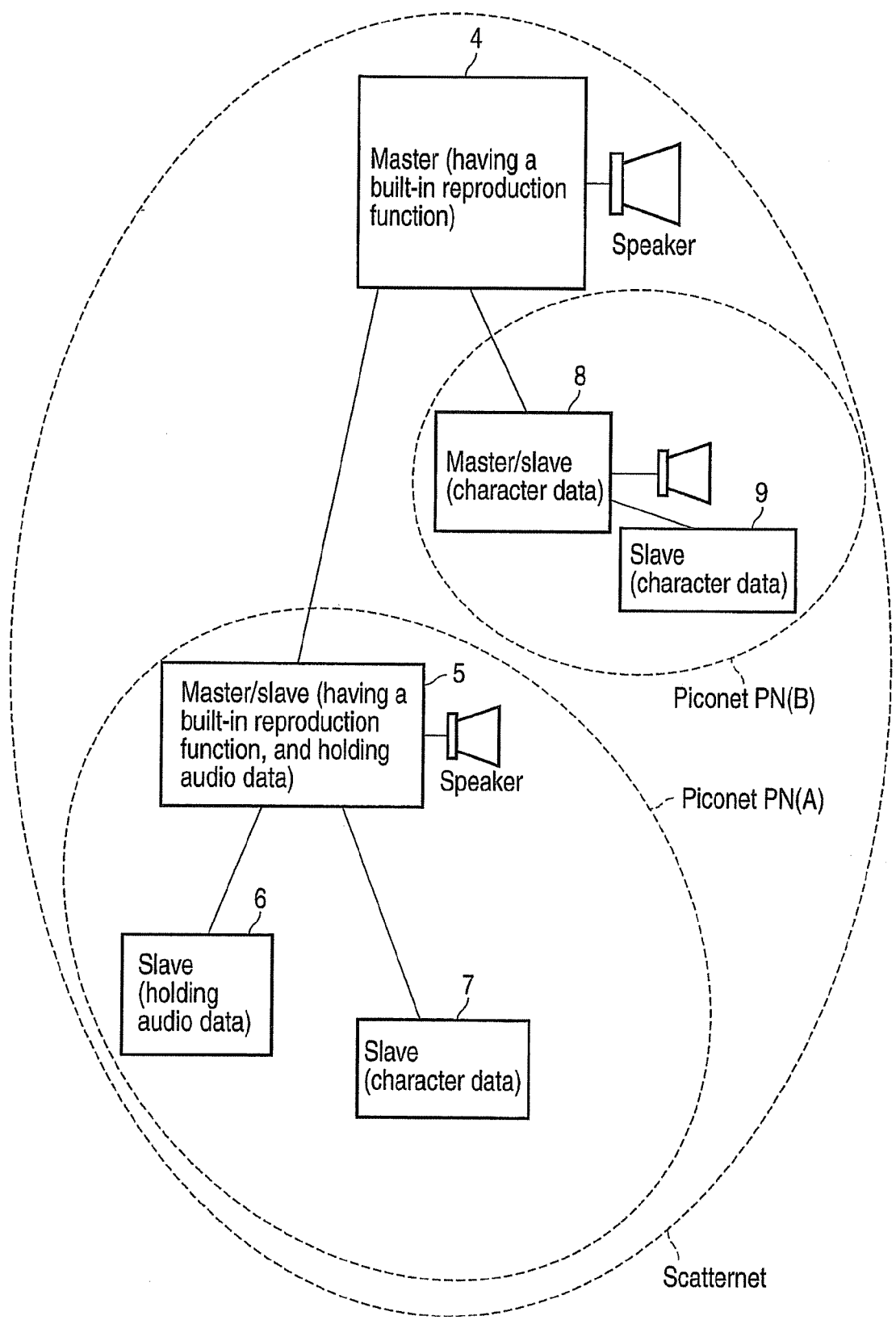

The Piconet shown in FIG. 1 can exist several, and these several Piconets form one network. FIG. 2 is a conceptual view showing a state that a plurality of Piconets is formed in a state of being connected like beads.

As illustrated in FIG. 2, a plurality of Piconets PN (A) and PN (B) exists in a state of being scattered, and these Piconets are included in a state of connected like beads. The foregoing network is called a scatternet. The Piconet PN (A) is formed of slaves 6, 7 and master 5.

The master 5 operates as a master of the Piconet PN (A), and simultaneously, operates as a slave with respect to a master 4 of the scatternet. The Piconet PN (B) is formed of a slave 9 and a master 8.

The master 8 operates as the master of the Piconet PN (B), and simultaneously, operates as a slave with respect to the master 4 of the scatternet. In this case, the master controlling the scatternet is one. The masters 5 and 8 of the Piconets PN (A) and PN (B) each have a function as a slave with respect to the master 4 of the scatternet. Simultaneously, these masters 5 and 8 each have a function as a master with respect to slaves in the Piconets PN (A) and PN (B). This is because one device cannot function as the master of some Piconets to make synchronization between Piconets.

FIG. 2 shows an example in which one master controls slaves included in the scatternet. But, some masters can control slaves included in the scatternet. The master 4 controls the slaves 6 and 7 via the master 5. But, the slaves 6 and 7 cannot simultaneously receive instructions from the masters 4 and 5. For this reason, transmitted and received data is divided into slots, and data transfer is carried out using time division multiplex. The same operation as above is carried out in the Piconet PN (B).

<Communication Method>

Figure 3:
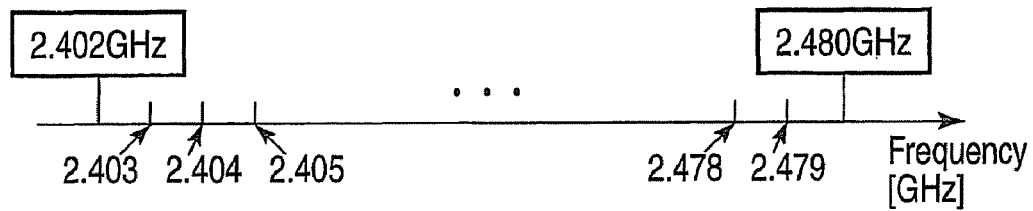
FIG. 3 is a view showing a frequency band used for the wireless communication system according to one embodiment of the invention.

A frequency band used for the Bluetooth standard will be described below with reference to FIG. 3. FIG. 3 is a view showing a frequency band usable in the Piconet according to this embodiment. As depicted in FIG. 3, a frequency band used between the master 1 and the slaves 2, 3 according to this embodiment is 2.4 [GHz] band predetermined by the Bluetooth standard. Specifically, a frequency from 2.402 to 2.480 [GHz] is divided into 79. That is, communications are carried out using any frequency of 2.402 [GHz], 2.403 [GHz], 2.404 [GHz], . . . , 2.480 [GHz]. According to the Bluetooth standard communication, a transmission speed is 1 [Mbps] to the maximum. A channel used for SCO link and ACL link exists in the frequency band. The foregoing link, that is, SCO link and ACL link will be described later.

According to the communication conformable to the Bluetooth standard, a frequency hopping type spectrum diffusion method is used, and thereby, a frequency assigned to 79 divisions is changed 1600 times for one second. In this way, interference with another device is reduced; namely, radio wave interference is prevented. Typically, a wireless LAN system conformable to IEEE 802.11 standard and a home appliance such as a microwave oven are given as an apparatus using a frequency 2.4 [GHz] band. According to the Bluetooth standard, the foregoing frequency hopping type spectrum diffusion method is used, and thereby, it is possible to prevent radio wave interference with the apparatuses using the frequency 2.4 [GHz] band.

Figure 4:
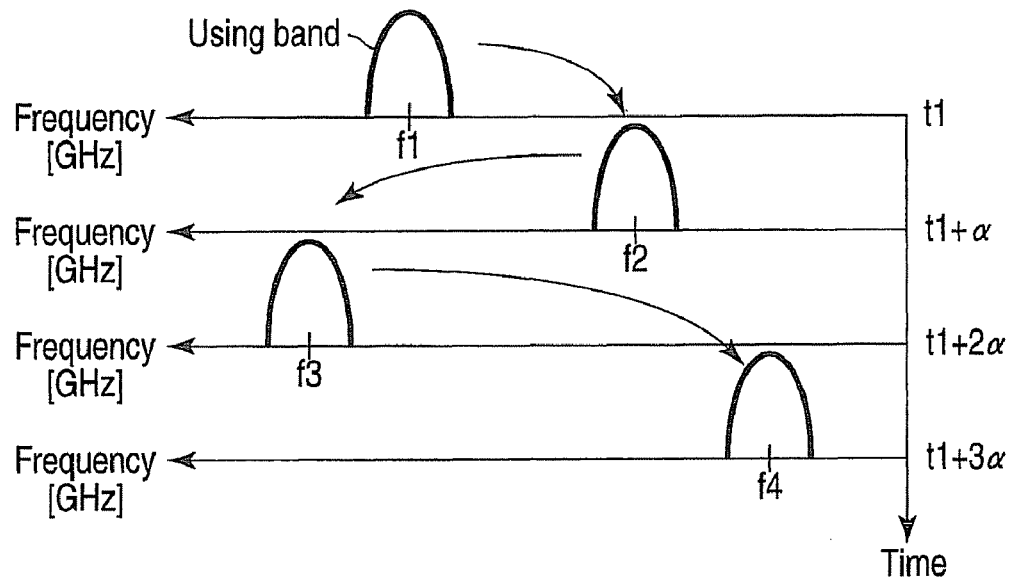
FIG. 4 is a conceptual view showing a communication state according to a communication method used by the wireless communication system according to one embodiment of the invention.

FIG. 4 is a conceptual view to explain a frequency hopping type spectrum diffusion method in communications conformable to the Bluetooth standard. In FIG. 4, the vertical axis takes an elapsed time, and the horizontal axis takes a frequency used at that time. FIG. 4 shows a state that the master 1, slaves 2 and 3 forming the Piconet change the using frequency band for each time (hopping). According to the communication conformable to the Bluetooth standard, the using frequency is changed 1600 times for one second. Thus, time of transferring data is 625 [μsec] while a frequency is kept constant. In FIG. 4, a value α denotes 625 [μsec]. A section for each 625 [μsec] calls one slot. The slot will be described later.

As seen from FIG. 4, a frequency f1 used at a certain time t1 is changed to a frequency f2 at time (t1+α). Likewise, the frequency f2 used at the time (t1+α) is changed to a frequency f3 at time (t1+2α), and the frequency f3 used at time (t1+2α) is changed to a frequency f4 at time (t1+3α). In other words, the frequency is changed every 625 [μsec]. As described above, according to the communication conformable to the Bluetooth standard, the frequency is sequentially changed, and thereby, frequency interference with other devices using 2.4 [GHz] band is prevented as possible as can.

A link method when wireless communications are made between the master 1 and slaves 2, 3 shown in FIG. 1 will be described below.

The following two links are given as a link method between master and slave according to the Bluetooth standard. One is a synchronous connection oriented (SCO) link, and another is an asynchronous connection oriented (ACL) link. The foregoing SCO link is a point-to-point link of a master with one specified slave, and used for a telephone quality voice bidirecional 64 [Kbps] communication. In the voice communication using the SCO link, even if a packet is not transmitted during communication resulting from a change for the worse of a transmission line condition, there is no need of retransmitting the same packet as above. On the contrary, the foregoing ACL link is a point-to-multi-point link of the master with some slaves, and used for data transfer between the master and the slaves. With a change for the worse of the transmission line condition, even if a packet from the master or slave is not transmitted during communications, the packet is retransmitted, and thereby, a constant quality is compensated.

According to this embodiment, data transfer is carried out using the ACL link of the foregoing two links. Hereinafter, data transfer means communications according to the ACL link method.

The following is an explanation about DH packet and DM packet used for data transfer.

The foregoing DH packet means a packet, which does not include a forward error correction code (FEC). The DM packet means a packet including the forward error correction code (FEC).

If the transmission line condition is good, the DH packet including no forward error correction code is used. Conversely, if the transmission line condition is not good, data transfer is carried out in a state that the packet is changed to the DM packet including the forward error correction code. In accordance with the transmission line condition, an amount of data of transferred DH packet or DM packet may be changed.

According to this embodiment, an explanation is given using the DH packet in particular. However, the data transfer operation is the same as the DM packet.

Figure 5:
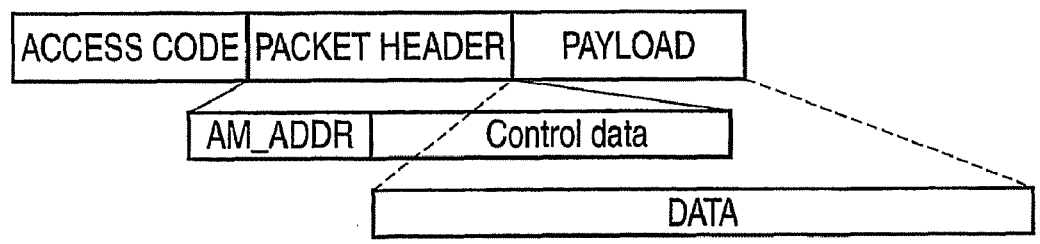
FIG. 5 is a view showing a data format used for the wireless communication system according to one embodiment of the invention.

A data format of packet transferred between the master 1 and the slaves 2, 3 will be described below with reference to FIG. 5. FIG. 5 shows a data format transmitted and received between the master 1 and the slaves 2, 3.

Roughly speaking, the data format includes an access code, a packet header and a payload.

The access code has data length of 68 or 72 [bits]. According to an access code transmitted from the master 1, the slaves 2 and 3 recognize a Piconet to which themselves belong, and take communication synchronization in the Piconet. In other words, according to the access code, the master and the slave in the Piconet can distinguish from each other. When the master 1 searches (execute inquiry processing) the slaves 2 and 3, the master 1 transmits data comprising the access code only. On the data transmission using the access code only, the data format has a data length of 68 [bits]. When a packet header is transmitted after the access code, the data format has a data length of 72 [bits].

The packet header has a data length of 54 [bits]. With the packet header, communication control is mainly carried out. The beginning of the packet header is provided with "AM_ADDR". The "AM_ADDR" has a value of 3 [bits]. The "AM_ADDR" includes addresses for recognizing seven slaves to the maximum. Namely, the "AM_ADDR" has values "001", "010", "011", . . . , "111". Specifically, the value of the "AM_ADDR" is composed of 3 [bits]; therefore, the number of slaves receivable in the Piconet is determined as seven to the maximum. In addition, control data includes information showing the foregoing SCO or ACL link.

The payload has a data length from 0 to 2745 [bits]. The payload includes content data transmitted and received actually between the master 1 and the slaves 2, 3.

A communication method between the master 1 and the slaves 2, 3 in the Piconet will be roughly described with reference to FIG. 6. FIG. 6 is a conceptual view showing a state that the master 1 gives a fixed period for data transfer to the slaves 2 and 3, and data transfer is made for each slot.

The slot will be described below. A unit used as a reference of timing when each packet is transmitted and received is called as slot. As described in FIG. 4, the frequency is hopped, and thereby, the using frequency is changed every 625 [μsec]. The slot means a section having a constant frequency until the current frequency is changed to the next frequency in a hopping process of the frequency used for the Piconet. Namely, the section of one slot is 625 [μsec], as seen from FIG. 6.

Each slot is further added with a serial number "0", "1", "2" . . . according to a timer included in the master 1. Hereinafter, the foregoing number calls a slot number SN. The slaves 2 and 3 in the Piconet synchronize a clock generated by the master 1. Thus, the slaves 2 and 3 can recognize a slot SN currently used by the master 1. In this case, as seen from FIG. 6, the master 1 transmits data from a slot added with an even number. The slaves 2 and 3 transmit data from a slot added with an odd number adjacent to the final packet transmitted at the even slot timing from the master. According to the Bluetooth standard, time division multiplex communications are made; therefore, data transmission and reception are alternately carried out according to the slot number added to the slot on the time axis as shown in FIG. 6.

Data transfer between the master 1 and the slaves 2, 3 is made using any of three packet lengths, that is, DH1, DH3 and DH5. The longer the packet length is, the more an amount of data once transferred becomes. A DH packet includes transmitter and receiver addresses when data transmission and reception between the master 1 and the slaves 2, 3 is carried out. The DH packet further includes transmitted content data. Namely, DH3 packet and DH5 packet aggregate the DH1 packet transmitted and received at one slot unit. Thus, these DH3 packet and DH5 packet can transfer a large number of data as compared with the DH1 packet at once. Specifically, if data transfer to be transferred from the slaves 2 and 3 is little, the DH1 packet is used. Conversely, if the data transfer is much, aggregated DH3 packet and DH5 packet are transferred using a plurality of slots at once. When the DH packet is transferred, different frequency is usually used every slot. However, when aggregated DH3 packet and DH5 packet are transmitted, a plurality of slots using the same frequency is used.

The following is an explanation about a data transfer allowable period (TPOLL) showing a period when the master 1 allows the slaves 2 and 3 to transfer data. The foregoing TPOLL indicates a fixed period when the master gives transmission chances to each slave, and the unit is slot. Specifically, in a plurality of slots included in the TPOLL, the master and a slave can continuously make communications. Hereinafter, the foregoing communications will be described.

If a maximum transmission unit (MTU) value of the slaves 2 and 3 is different, a TPOLL value obtained from the MTU value shows a different value. The foregoing MTU shows the maximum value of data transferred by the slaves 2 and 3 in one-time data transfer. Hereinafter, TPOLLs assigned to the slaves 2 and 3 call TPOLL2 and TPOLL3. As shown in FIG. 6, the TPOLL2 to the slave 2 is "10", and the TPOLL3 to the slave 2 is "8". In other words, a data transmittable period is different between the foregoing TPOLL2 and TPOLL3. Even if the slaves 2 and 3 have the same MTU value, data processors 23 and 28 (described later) included in the master 1 changes a data transfer rate for receiving from the slaves 2 and 3. In this way, the TPOLL values of the slaves 2 and 3 are set to be different from each other.

Incidentally, the value of the foregoing TPOLL2 and TPOLL3 may be the same. However, particularly, when the TPOLL value is the same, timing of transmitting a POLL packet from the master 1 to the slaves 2 and 3 has a need to be shifted, as seen from FIG. 6. Namely, start timing of TPOLL2 and TPOLL3 must be made different. Because, each POLL packet transmission to the slaves 2 and 3 is a processing of being necessarily executed for each TPOLL section. In addition, when receiving the POLL packet from the master 1, the slaves 2 and 3 start data transfer. Specifically, as shown in FIG. 6, the master 1 transmits a POLL packet to the slave 2 at the slots SN="6", "16" while transmits a POLL packet to the slave 3 at the slot SN="12". In other words, data processors 23 and 28 calculate TPOLL2 and TPOLL3 periods based on each MTU of the slaves 2 and 3. Then, the master 1 transmits a POLL packet at the calculated TPOLL2 and TPOLL3 periods. As a result, the slaves 2 and 3 receiving the POLL packet from the master 1 have data transfer allowance at the foregoing given TPOLL period. Specifically, data transferable timing by the slave 2 is a slot SN=odd numbers in the TPOLL2. Moreover, data transferable timing by the slave 3 is a slot SN=odd numbers in the TPOLL3.

The kind of packet transmitted and received between the master 1 and the slaves 2, 3 will be described below. A POLL packet, a data packet, a NULL packet, a DH packet and a DM packet are given as the kind of data. The unit calling the slot is used as a reference of timing when these packets are transmitted and received.

The POLL packet is a packet such that when making a data exchange with slaves 2 and 3, the master 1 transmits this POLL packet at even slot timing necessarily once per each TPOLL. In this way, the master 1 asks whether or not data to be transmitted exists with respect to the slaves 2 and 3. Thus, the master 1 gives a data transfer chances to slaves 2 and 3 holding data. When receiving the POLL packet, the slaves 2 and 3 make a reception acknowledge response. The POLL packet is provided with the following information. One is information showing the transmitter, that is, the master 1. Another is information showing address of any of the slaves 2 or 3. Namely, the master 1 and the slaves 2 and 3 mutually confirm the transmitter and address information added to the POLL packet. In this way, data transmitted and received between the master 1 and the slaves 2, 3 is identified; therefore, communications are possible without an error. When receiving a POLL packet, which is not addressed for themselves, the slaves 2 and 3 recognize that the POLL packet is not for themselves, and then, ignore the POLL packet. The other data packets, i.e., NULL packet, DH packet and DM packet include information capable of recognizing each other likewise.

The data packet is transmitted from an even slot when data transfer with the slaves 2 and 3 is made, like the POLL packet. The data packet further includes a role of giving data transfer chances to the slaves 2 and 3, in addition to frequency band notification, for example, which is not used in the Piconet. For example, if a wireless LAN system conformable to IEEE 802.11b exists near the Piconet including the master 1, slaves 2 and 3, the data packet includes the following information. That is, information for executing control so that a conflict with a frequency channel used by the wireless LAN system does not occur.

If the master 1 is a transmitter holding data, the data packet is transmitted from an even slot in the case where data is transmitted to the slaves 2 and 3.

Thus, the foregoing DH packet and DM packet are one of the data packets.

The NULL packet is a reception acknowledge response packet, which is transmitted when the slaves 2 and 3 received the POLL packet transmitted from the master 1 has no data to transfer. Namely, a slave receiving the POLL packet from the master 1 must always transmits the DH packet or DM packet or NULL packet. When data transfer from the slave 2 is made in response to the POLL packet or the data packet, the master 1 determines that there is a need of further receiving data from the slave 2. In this case, the master 1 transmits a NULL packet to the slave 2 in order to receive the next data. The slave 2 has no need to make a reception acknowledge response with respect to the reception of the NULL packet transmitted from the master 1. Namely, when the next data transfer from the slave 2 ends, the slave 2 has no need to make a reception acknowledge response with respect to the NULL packet even if the master 1 sends the NULL packet.

<Configuration of the Master 1>

Figure 7:
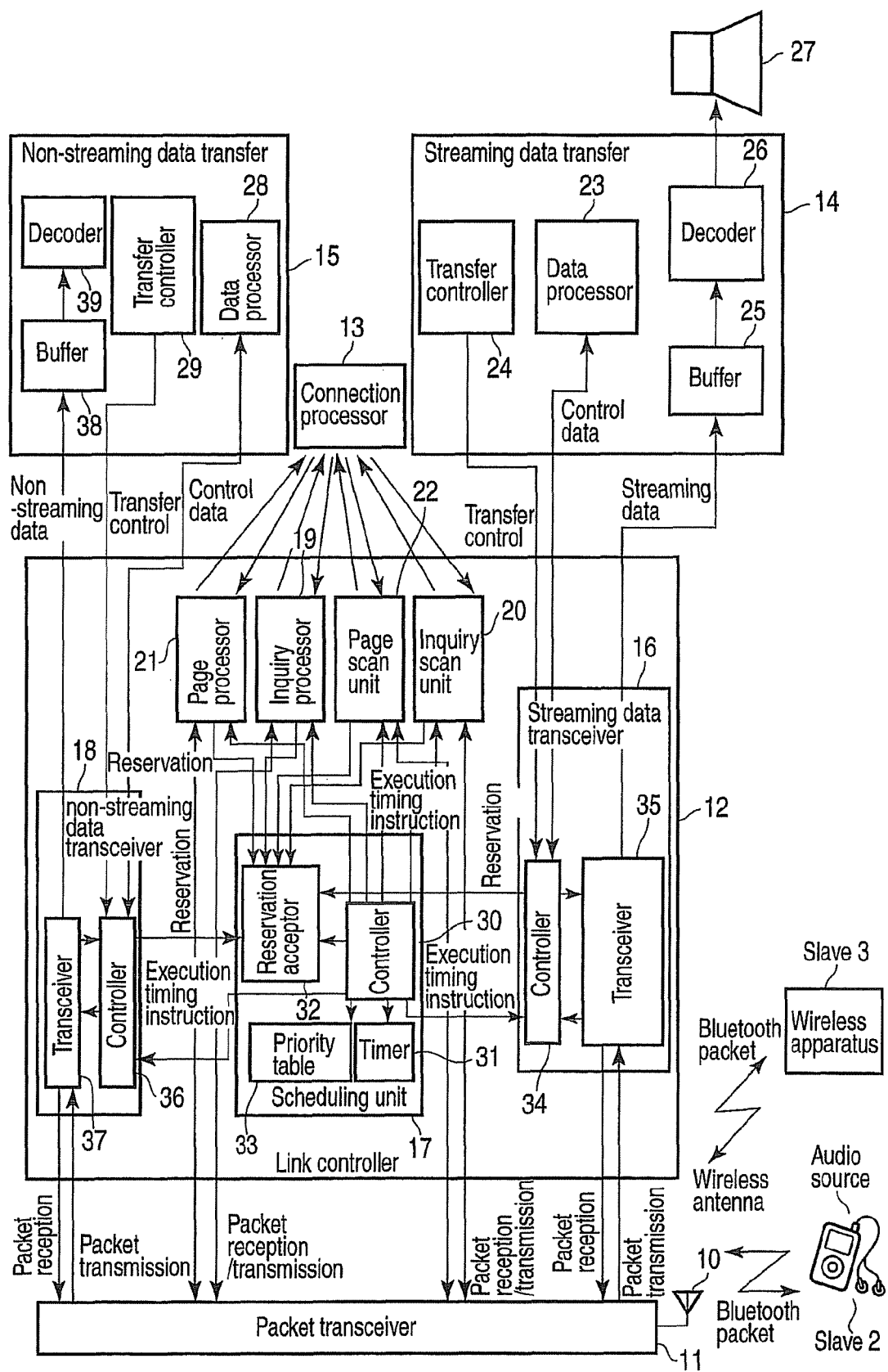
FIG. 7 is a block diagram showing the configuration of a wireless communication system according to one embodiment of the invention.

The internal configuration of the master 1 shown in FIG. 1 will be described with reference to FIG. 7. FIG. 7 is a block diagram showing the configuration of a master 1 according to this embodiment. According to this embodiment, for example, the slave 2 is set as an audio reproduction apparatus, and the slave 3 is set as an apparatus such as PDA holding character data. Namely, transfer data from the slave 2 is streaming data requiring real-time characteristic. Transfer data from the slave 3 is non-streaming data, which does not require real-time characteristic.

As shown in FIG. 7, the master 1 mainly includes an antenna 10, a packet transceiver (RF unit) 11, a link controller 12, a connection processor 13, a streaming data transfer 14, a non-streaming data transfer 15 and a speaker 27.

The antenna 10 receives a wireless signal (RF signal: Bluetooth packet) transmitted from the slaves 2 and 3, and transmits the wireless signal to the slaves 2 and 3.

When receiving a wireless signal, the packet transceiver 11 down-converts a 2.4 [GHz] band wireless signal (Bluetooth packet) received by the antenna 10 to divide the received signal into streaming data ad non-streaming data. Thereafter, the packet transceiver 11 supplies the divided streaming packet and non-streaming packet to the link controller 12. When transmitting the wireless signal, the packet transceiver 11 up-converts streaming packet and non-streaming packet independently supplied from the link controller 12 to a 2.4 GHz band wireless signal, and then, transmits them via the antenna 10.

The link controller 12 supplies streaming packet and non-streaming packet down-converted by the packet transceiver 11 to the streaming data transfer 14 and the non-streaming data transfer 15, respectively.

In other words, the link controller 12 supplies a packet received from the slave 2 to the streaming data transfer 14 while supplies a packet received from the slave 3 to the streaming data transfer 15.

The link controller 12 further receives each TPOLL value for data transfer with slaves 2 and 3 from the streaming data transfer 14 and the non-streaming data transfer 15. The link controller 12 executes data transfer with slaves 2 and 3 via the packet transceiver 11 according to each received TPOLL value of slaves 2 and 3. When receiving connection processing instructions (described later) from the connection processor 13, the link controller 12 makes a connection with a device having a Bluetooth function except slaves 2 and 3.

The connection processor 13 will be described hereinafter. The connection processor 13 gives instructions to the link controller 12 to make a connection with a device having a Bluetooth function except slaves 2 and 3.

The streaming data transfer 14 and the non-streaming data transfer 15 each calculate a TPOLL value based on MTU values and data transfer rates of slaves 2 and 3 received from the link controller 12. Thereafter, the foregoing transfers 14 and 15 returns the calculated result to the link controller 12. The streaming data transfer 14 decodes the received streaming data of the slave 2, and thereafter, transfers audio data to the speaker 27.

<Details of Processors 12 to 15>

The foregoing link controller 12, connection processor 13, streaming data transfer 14 and non-streaming data transfer 15 will be described in detail.

<<Connection Processor 13>>

The details of the connection processor 13 will be described. The connection processor 13 executes a connection processing. The connection processing is a processing such that the master 1 searches slaves existing around to create a state capable of making communications with those. If the master 1 functions as a slave in a scatternet, the connection processing is a processing for creating a state capable of making communications with a master in the scatternet.

For example, the foregoing connection processing includes inquiry processing, inquiry scan processing, page processing and page scan processing. The connection processor 13 gives instructions to execute the foregoing processings to an inquiry processor 19, an inquiry scan processor 20, a page processor 21 and a page scan processor 22. Hereinafter, the flow of the foregoing connection processing will be described.

Figure 8:
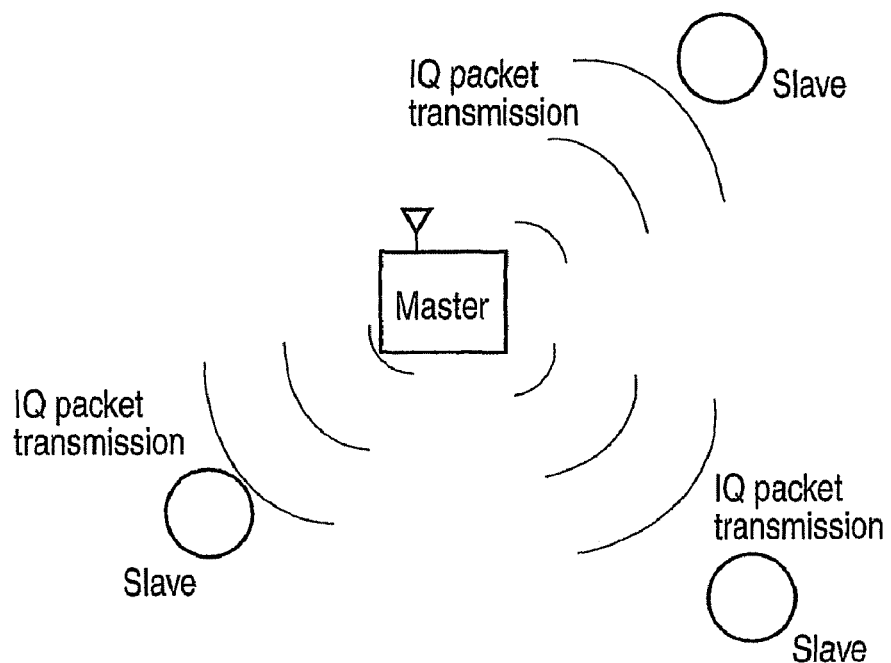

According to the connection processing, first, the inquiry processing in the master 1 and the inquiry scan processing in slaves 2 and 3 are executed. According to the inquiry processing, the master 1 searches slaves having a Bluetooth function existing around. The inquiry processing will be described with reference to FIG. 8. FIG. 8 is a conceptual view to explain an inquiry processing. As shown in FIG. 8, the master 1 transmits IQ packets including the access code shown in FIG. 5 using broadcast while changing a frequency at a half speed of the slot. The IQ packet is a packet used for searching slaves. In response to the IQ packet, the slaves transmit an FHS packet, and then, the master 1 receives it. The foregoing series of processing is the inquiry processing. FIG. 8 only shows a state the master transmits the IQ packet. Slaves 2 and 3 are positioned within a distance of about 10 m from the master 1.

Figure 9:
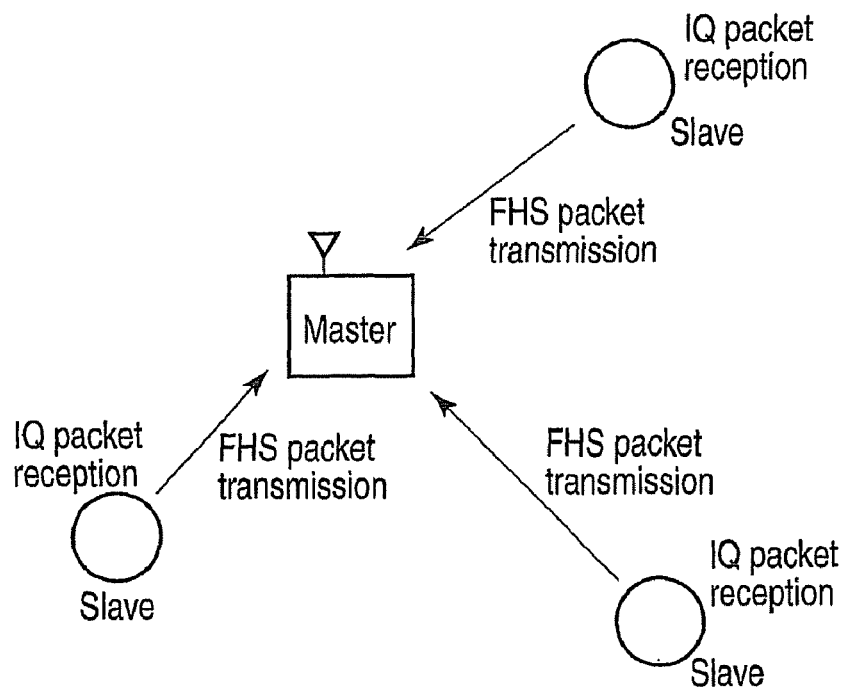

The inquiry scan processing is a processing executed pairing with the inquiry processing. Namely, it is a processing until, in response to the IQ packet transmitted by the master 1, the slave transmits the FHS packet. FIG. 9 is a conceptual view to explain an inquiry scan processing. As illustrated in FIG. 9, slaves 2 and 3 received the IQ packet transmitted from the master 1 return an FHS packet to the master 1. The master 1 receives the FHS packet to grasp each existence of slaves 2 and 3. In this case, slaves 2 and 3 scan a frequency while changing the frequency at a speed slower than a frequency change speed when the master 1 transmits the IQ packet. In this way, slaves 2 and 3 can receive the IQ packet.

The foregoing inquiry scan processing includes the following processing. Specifically, if the master 1 functions as a slave in the scatternet (see FIG. 2), the inquiry scan processing includes a series of processing from receiving the IQ packet to transmitting the FHS packet to the master of the scatternet.

The foregoing IQ packet and FHS packet are transmitted and received, and thereby, the master can grasp the existence of slaves and information related to the slaves.

After the foregoing inquiry processing and inquiry scan processing, the master 1 executes a page processing and slaves 2 and 3 execute a page scan processing. The page processing is a processing for making a connection between the master 1 and any of slaves 2 and 3 making a data exchange and existing around the master 1. FIG. 10 is a conceptual view to explain a page processing. First, the master 1 transmits an ID packet to slaves 2 and 3. Then, slaves 2 and 3 transmit the ID packet. When receiving the ID packet from slaves 2 and 3, the master 1 transmits an FHS packet including information on the master 1. In response to the transmitted FHS packet, the master 1 receives the ID packet transmitted from slaves 2 and 3. Namely, the master 1 transmits ID packets and FHS packets to slaves, and receives the ID packets from slaves 2 and 3, and thereby, specifies the slave. In this way, slave information is grasped. This is the page processing. In this stage, the master 1 grasps the existence of slaves 2 and 3. As shown in FIG. 10, the master 1 transmits an ID packet including an access code to slaves 2 and 3 at half speed of one slot while changing the frequency to make a baseband connection. The ID packet includes information of slaves 2 and 3. In this case, the transmission destination of the ID packet is a slave, which is selected as a data exchange with the master 1, of slaves searched according to the foregoing inquiry processing and inquiry scan processing. FIG. 10 shows a state that the master transmits the ID packet and the FHS packet.

The page scan processing is a processing pairing with the page processing. Specifically, when slaves 2 and 3 receive the ID packet from the master 1 according to the page processing, slaves 2 and 3 transmit the ID packet in response to the ID packet transmission. And then, slaves 2 and 3 received the FHS packet transmitted from the master 1 transmit the ID packet. FIG. 11 is a conceptual view to explain a page scan processing. As depicted in FIG. 11, slaves 2 and 3 receive the ID packet transmitted from the master 1 return the ID packet to the master 1. And then, when receiving the FHS packet transmitted from the master 1 received the ID packet, slaves 2 and 3 transmit the ID packet. In this case, slaves 2 and 3 scan a frequency while changing the frequency at a speed slower than a frequency change speed when the master 1 transmits the ID packet. In this way, slaves 2 and 3 can receive the ID packet. Namely, reception of the ID and FHS packets from the master 1 and transmission of the ID packet to the master 1 are the page scan processing. Therefore, the page scan processing is a processing mainly executed when the self functions as a slave.

The page scan processing includes the following processing. Specifically, if the master 1 functions as a slave in the scatternet, the page processing includes a series of processing from reception of the ID packet from the master of the scatternet to transmission of the ID packet to the master of the scatternet.

After the foregoing inquiry processing/inquiry scan processing and page processing/page scan processing, a clock is synchronized between the master 1, salves 2 and 3, and processings such as encryption of transmitted/received data and authorization are executed. In this way, desired data transfer is possible between the master 1, salves 2 and 3. This is the connection processing.

The foregoing connection processing is executed to establish a Piconet, and thereafter, the master 1 recognizes a profile of slaves 2 and 3. The profile shows the kind of data in which the slave transfers to the master 1. Specifically, the master 1 recognizes the profile from slaves 2 and 3, and thereby, confirms the following information. Namely, the slave 2 holds audio data, and the slave 3 holds data having no sense of real-time characteristic.

<<Link Controller 12>>

Referring again to FIG. 7, the details of the link controller 12 will be described. As seen from FIG. 7, the link controller 12 includes a streaming data transceiver 16, a non-streaming data transceiver 18, a scheduling unit 17, an inquiry processor 19, an inquiry scan unit 20, a page processor 21 and a page scan unit 22.

<<Streaming Data Transceiver 16>>

The streaming data transceiver 16 includes a controller 34 and a transceiver 35. The transceiver 35 handles a streaming data packet of the slave 2 received from the packet transceiver 11. Then, the transceiver 35 supplies the streaming data packet and transfer control data required for streaming to the streaming data transfer 14. When receiving transmission instructions of POLL packet or NULL packet from the controller 34, the transceiver 35 transmits POLL packet or NULL packet to the slave 2.

The controller 34 makes a reservation for timing of transmitting the POLL packet every TPOLL to the scheduling unit 17 in order to receive streaming data from the slave 2. When the scheduling unit 17 allows the foregoing reservation, the controller 34 gives instructions to transmit the POLL packet to the slave 2 to the transceiver 35. When the transceiver 35 receives streaming data transmitted by the slave 2 in response to the POLL packet, the controller 34 determines that streaming data transfer is further required. In this case, the controller 34 makes a NULL packet transmission reservation to the scheduling unit 17 in order to receive the next streaming data from the slave 2. When the scheduling unit 17 allows the foregoing reservation, the controller 34 gives instructions to transmit the NULL packet to the slave 2 to the transceiver 35.

<<Non-Streaming Data Transceiver 18>>

The non-streaming data transceiver 18 will be described. The non-streaming data transceiver 18 includes a controller 36 and a transceiver 37. The controller 36 and the transceiver 37 have the same function as the controller 34 and the transceiver 35 included in the streaming data transceiver 16 except handling non-streaming data. Specifically, the transceiver 37 included in the non-streaming data transceiver 18 handles a non-streaming data packet of the slave 3 received from the packet transceiver 11. Then, the transceiver 37 supplies the non-streaming data packet and transfer control data required for streaming to the non-streaming data transfer 15. When receiving transmission instructions of POLL packet or NULL packet from the controller 36, the transceiver 37 transmits POLL packet or NULL packet to the slave 3.

The controller 36 makes a reservation for timing of transmitting the POLL packet every TPOLL to the scheduling unit 17 in order to receive non-streaming data from the slave 3. When the scheduling unit 17 allows the foregoing reservation, the controller 36 gives instructions to transmit the POLL packet to the slave 3 to the transceiver 37. When the transceiver 37 receives non-streaming data transmitted by the slave 3 in response to the POLL packet, the controller 36 determines that non-streaming data transfer is further required. In this case, the controller 36 makes a NULL packet transmission reservation to the scheduling unit 17 in order to receive the next non-streaming data from the slave 3. When the scheduling unit 17 allows the foregoing reservation, the controller 36 gives instructions to transmit the NULL packet to the slave 3 to the transceiver 37.

<<Inquiry Processor 19, Inquiry Scan Unit 20, Page Processor 21, Page Scan Unit 22>>

The inquiry processor 19, inquiry scan unit 20, page processor 21 and page scan unit 22 will be described below.

When receiving inquiry processing instructions from the connection processor 13, the inquiry processor 19 reserves an inquiry processing with respect to the scheduling unit 17. When the scheduling unit 17 allows the foregoing reservation, the inquiry processor 19 executes an inquiry processing via the packet transceiver 11. More specifically, the inquiry processor 19 reserves a transmission of an IQ packet, and when the reservation is allowed, transmits the IQ packet from the packet transceiver 11. The inquiry processor 19 further receives an FHS packet from slaves 2, 3 received the IQ packet via the packet transceiver 11.

The inquiry scan unit 20 operates when the master 1 itself simultaneously functions as a slave, and then, executes the foregoing inquiry scan processing. Specifically, when receiving inquiry scan processing instructions from the connection processor 13, the inquiry scan unit 20 reserves an inquiry scan processing with respect to the scheduling unit 17. When the scheduling unit allows the foregoing reservation, the inquiry scan unit 20 executes the inquiry scan processing via the packet transceiver 11. More specifically, the inquiry scan unit 20 receives an IQ packet via the packet transceiver 11 from the master executing the foregoing inquiry processing. When receiving the IQ packet, the inquiry scan unit 20 reserves an FHS packet transmission. When the foregoing reservation is allowed, the inquiry scan unit 20 transmits the FHS packet from the packet transceiver 11.

When receiving page processing instructions from the connection processor 13, the page processor 21 reserves a page processing with respect to the scheduling unit 17. When the scheduling unit 17 allows the foregoing reservation of the page processing, the page processor 21 executes a page processing via the packet transceiver 11. More specifically, the page processor 21 reserves a transmission of an ID packet and an FHS packet, and when the reservation is allowed, transmits the foregoing ID and FHS packets from the packet transceiver 11. The page processor 21 further receives the ID packet transmitted from slaves 2, 3 received the foregoing ID and FHS packets via the packet transceiver 11.

The page scan unit 22 operates when the master 1 itself simultaneously functions as a slave, and then, executes the foregoing page scan processing. Specifically, when receiving page scan processing instructions from the connection processor 13, the page scan unit 22 reserves a page scan processing with respect to the scheduling unit 17. When the scheduling unit allows the foregoing reservation, the page scan unit 22 executes the page scan processing via the packet transceiver 11. More specifically, the page scan unit 22 receives an ID packet and an FHS packet via the packet transceiver 11 from the master executing the foregoing page processing. When receiving the foregoing ID and FHS packets, the page scan unit 22 reserves an ID packet transmission. When the foregoing reservation is allowed, the page scan unit 22 transmits the ID packet from the packet transceiver 11.

If the foregoing connection processing is executed regardless of before and after a Piconet is formed, IQ packet transmission by the inquiry processor 19, FHS packet transmission by the inquiry scan unit 20, ID and FHS packet transmission by page processor 21 and page scan unit 22 are executed when allowance from the scheduling unit 17 is given.

<<Scheduling Unit 17>>

The scheduling unit 17 will be described below. The scheduling unit accepts the reservation from the foregoing streaming data transceiver 16, non-streaming data transceiver 18, inquiry processor 19, inquiry scan unit 20, page processor 21 and page scan unit 22. When timing of allowing the reservation comes, the scheduling unit 17 allows the execution with respect to a processor making a reservation. If a plurality of reservations is made in the same slot, the scheduling unit 17 selects any one of the reservations, and then, allows it. Incidentally, the scheduling unit 17 previously gives execution timing with respect to reservations from various processors.

The internal configuration of the scheduling unit 17 will be described below. As shown in FIG. 7, the scheduling unit 17 includes a controller 30, a timer 31, a reservation acceptor 32 and a priority table 33.

The reservation acceptor 32 accepts the following reservations. One is a POLL packet transmission reservation with respect to slaves 2 and 3 by streaming and non-streaming data transceivers 16 and 18. Another is a data packet transmission reservation. Another is a NULL packet transmission reservation. Another is a connection processing reservation from inquiry processor 19, inquiry scan unit 20, page processor 21 and page scan unit 22.

The priority table 33 is held in a nonvolatile memory, for example. The priority table 33 holds a priority rank of the processing to be allowed of the reservations accepted by the reservation acceptor 32. The priority table 33 will be described with reference to FIG. 12. FIG. 12 is a priority table 33 included in the scheduling unit 17.

As seen from FIG. 17, the priority table 33 holds data showing relative priority with respect to the following transmissions and processing. One is a POLL packet transmission to a slave requiring streaming for each TPOLL. Another is a POLL packet transmission to a slave requiring no streaming for each TPOLL. Another is a NULL packet transmission to a slave requiring streaming. Another is a connection processing to other device having a Bluetooth function by inquiry, inquiry scan, page and page scan processings. Another is a NULL packet transmission to a slave requiring no streaming.

Specifically, the high priority order of the priority shown in FIG. 12 is as follows.

1: POLL packet transmission to slave 2 by streaming data transceiver 16

2: POLL packet transmission to slave 3 by non-streaming data transceiver 18

3: NULL packet transmission to slave 2 by streaming data transceiver 16

4: Inquiry processing, inquiry scan processing, page processing and page scan processing 5: NULL packet transmission to slave 3 by non-streaming data transceiver 18

Namely, the master 1 refers to the priority table 33 holding the transmission priority order every the kind of packets (POLL packet, NULL packet, packet for search and connection).

The following is an explanation about the case where a POLL packet is transmitted in the first slot of TPOLL. However, if the master 1 transmits a data packet in place of the POLL packet in the first slot of TPOLL, the transmission reservation of the data packet has the highest priority.

The priority of the POLL packet is not limited to the foregoing pattern. Specifically, the priority of POLL packet transmission to the slave 3 by the non-streaming data transceiver 18 may be higher than the priority of POLL packet transmission to the slave 2 by the streaming data transceiver 16. The POLL packet transmission to the slave 2 by the streaming data transceiver 16 and the POLL packet transmission to the slave 3 by the non-streaming data transceiver 18 may be set to the same priority. In this case, the execution timing of the foregoing two transmissions is shifted.

The timer 31 is used as a reference when the master 1, slaves 2 and 3 transfer data. Namely, slaves 2 and 3 takes synchronization with the timer 31 included in the master 1, and thereby, know a timing of the slot to transmit.

The controller 30 confirms a reserved processing accepted by the reservation acceptor 32 for each even slot number. If the reservation acceptor 32 has no any of the foregoing reservations, the controller 30 confirms whether or not a reservation is made in the next slot. If only one reservation is made in the target slot, the controller 30 allows the execution to the processing unit making a reservation when timing of executing the reserved processing comes.

If a plurality of reservations is made in the target slot, the controller 30 refers to the priority table 33 shown in FIG. 12. The controller 30 refers to the priority table 33; as a result, the controller 30 selects any one having the highest priority of the processings reserved by the reservation acceptor 32. When timing of executing the reserved processing comes, the controller 30 allows the execution with respect to the foregoing selected any processing unit.

<<Streaming Data Transfer 14>>

The details of the streaming data transfer 14 will be described below. As depicted in FIG. 7, the streaming data transfer 14 includes a transfer controller 24, a data processor 23, a buffer 25 and a decoder 26. The transfer controller 24 makes a data exchange for controlling a link with the slave 2 via the streaming data transceiver 16 so that the master 1 receives streaming data from the slave 2.

The data processor 23 calculates a TPOLL2 value from an MTU of the slave 2 and a transfer rate of data received from the slave 2. If data is streaming data such as audio data in this embodiment, the data size is large; in such a case, data is transmitted from the slave in a state of being divided.

For example, suppose the MTU value of the slave 2 is 672 bytes, and the master 1 executes streaming satisfying a 400 kbps data transfer rate. In this case, the TPOLL2 value is obtained from the following equation.

$$TPOLL2=(672\times8)/400,000\times1600=21.504 \text{ slots}$$

From the foregoing equation, the TPOLL2 value is 21 slots (round down decimal places). However, data transfer by the master 1 is an even number. Thus, the TPOLL value is "20". Namely, a POLL packet transmitted from the master 1 to the slave 2 is every 20 slots. Therefore, a chance of data transfer by the slave 2 is allowed at a 20-slot period.

The details of the streaming data transfer 14 will be described.

The buffer 25 buffers streaming data received from the streaming data transceiver 16.

In general, the buffer is a storage and storage area for temporarily holding data to compensate for the difference of a processing speed and a transfer rate. In this embodiment, the streaming data received from the slave 2 is successively supplied to the decoder 26. A comparison is made between the transfer rate of the streaming data received from the slave 2 and a speed of reproducing the audio data by speaker 27. Obviously, the transfer rate of the streaming data is fast. If the buffer 25 is not provided, reproduction by the speaker 27 is not caught up; for this reason, the audio data is reproduced intermittently. Thus, the buffer 25 has a function of compensating the foregoing difference.

The decoder 26 decodes the coded streaming data received from the buffer 25, and thereafter, supplies audio data to the speaker 27.

The speaker 27 reproduces the audio data supplied from the decoder 26.

<<Non-Streaming Data Transfer 15>>

The details of the non-streaming data transfer 15 will be described below. As illustrated in FIG. 7, the non-streaming data transfer 15 includes a data processor 28, a transfer controller 29, a buffer 38, and a decoder 39.

The data processor 28 calculates a TPOLL3 value from an MTU of the slave 3 like the data processor 23. Namely, the data processor 28 supplies the TPOLL3 value to the non-streaming data transceiver 18. In this way, the non-streaming data transceiver 18 transmits a POLL packet to the slave 3 for each TPOLL3 section.

The transfer controller 29 makes an exchange of non-streaming data with the non-streaming data transceiver 18.

The buffer 38 and the decoder 39 operate in the same manner as the buffer 25 and the decoder 26 except handling non-streaming data. Namely, the buffer 38 buffers non-streaming data received from the non-streaming data transceiver 18.

The decoder 39 decodes the coded non-streaming data received from the buffer 38.

<Communication Method>

A communication method used for the foregoing wireless communication system will be hereinafter described using the operation of the master 1 in the Piconet shown in FIG. 1. FIG. 13 is a flowchart to explain a wireless communication method according to this embodiment.

First, the master 1 confirms that a Piconet is established (S0). If the Piconet is not established (NO in S0), the master makes a connection processing with respect to slaves existing within a 10 [m] area around the master 1 to establish the Piconet (S1). After step S1 or if the Piconet is established (YES in S0), the master 1 confirms whether or not a TPOLL value is set with respect to slaves (S2). If the TPOLL value is not set (NO in S2), the controllers 34 and 36 set the TPOLL value (S3). Specifically, the controller 34 supplies an MTU value of the slave 2 acquired in the connection processing process in step S1 to the data processor 23. Further, the controller 36 supplies an MTU value of the slave 3 to the data processor 28. In this way, the data processor 23 calculates a TPOLL value to the slave 2 based on the MTU value of the slave 2 received from the controller 34 and a data transfer rate received from the slave 2. Then, the data processor 23 supplies the calculated TPOLL2 value to the controller 34. Likewise, the data processor 28 calculates a TPOLL value to the slave 3 based on the MTU value of the slave 3 received from the controller 36 and a data transfer rate received from the slave 3. Then, the data processor 28 supplies the calculated TPOLL3 value to the controller 36.

The result of step S2, that is, if the TPOLL value is set (YES in S2) and after the TPOLL is set in step S3, the controller 34 reserves a POLL packet transmission to the slave 2 the scheduling unit 17. Likewise, the controller 36 gives a notification of a reservation of a POLL packet transmission to the slave 3 to the scheduling unit 17 for each TPOLL based on the received TPOLL3 value (S4). Besides, if a request of a NULL packet transmission and a connection processing by the connection processor 13 is made, the foregoing reservations are set in the scheduling unit 17 (S4).

The scheduling unit 17 selects a reservation having high priority of reservations accepted in step S4 (S5). When timing of executing the selected reservation comes, the scheduling unit 17 allows an execution of the reservation with respect to the processor making the reservation (S5). In step S5, any of the processors receiving acceptance by the scheduling unit 17 executes the reserved processing (S6).

<<Details of Step S5>>

The detailed operation of the scheduling unit 17 in step S5 shown in FIG. 13 will be described with reference to FIG. 14. FIG. 14 is a flowchart to explain the operation flow of the scheduling unit 17, and shows the details of step S5.

First, the controller 30 confirms that the reservation acceptor 32 accepts a reservation from each processor in the target slot (step S10). If the reservation is not made (NO in S11), the controller waits until the next slot comes, and then, confirms that a reservation is made (S10). If the reservation is made (YES in S11), the controller 30 confirms whether or not some reservations are made in the next target slot of the reservation acceptor 32 (S12). If some reservations are not made (NO in S13), when time shown by the timer 31 reaches timing of executing the reserved processing, the controller 30 allows the execution with respect to each processor making a reservation (S17). In step S12, if some reservations are made (YES in S13), the controller 30 refers to the priority table 33 (S14). Based on the priority table 33 shown in FIG. 12, the controller 30 selects a reservation having the highest priority of processings reserved in the reservation acceptor 32 (S15). Then, the controller 30 allows the reservation at the execution timing of the reservation selected in step S15 (S16).

<<Details of Steps S14 and 15>>

Figure 15:
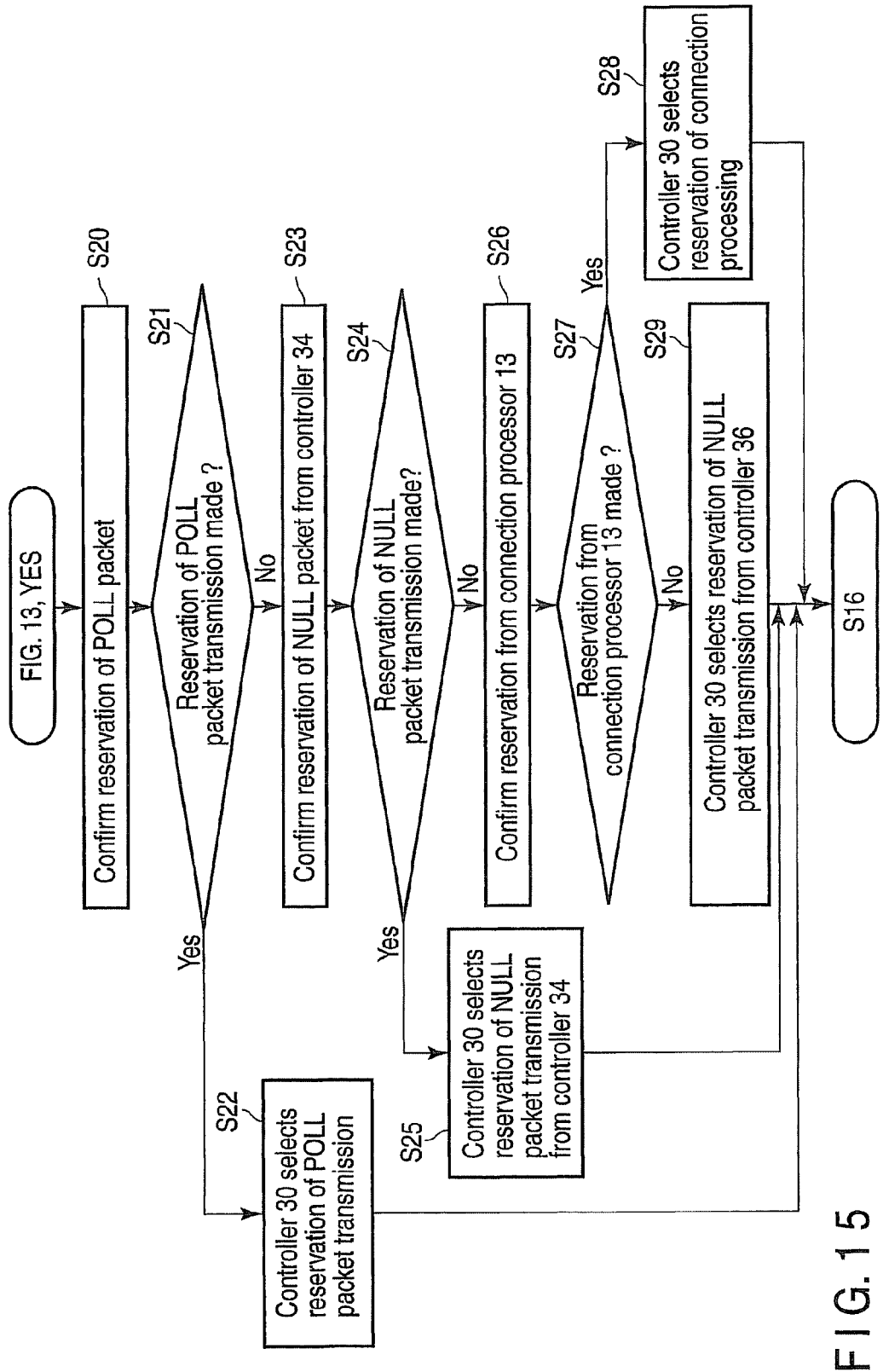

The detailed operation of the controller 30 in steps S14 and S15 will be described with reference to FIG. 15. FIG. 15 is a flowchart to explain the details of steps S14 and S15.

As shown in FIG. 15, the controller 30 confirms that a reservation of a POLL packet transmission is made by any of the controllers 34 and 36 (S20). As described above, the reservations of the POLL packet transmission by the controllers 34 and 36 do not overlap in the same slot. If the reservation of a POLL packet transmission by any of the controllers 34 and 36 is made (YES in S21), the controller 30 select the reservation (S22). Specifically, the POLL packet transmission is executed in step S6 regardless of other reservations. If the reservation of the POLL packet transmission is not made (NO in S21), the controller 30 confirms whether or not the controller 34 makes a reservation of a NULL packet transmission (S23). If the reservation is made (YES in S24), the controller 30 selects the reservation of the NULL packet transmission by the controller 34 (S25). If the reservation of the NULL packet transmission is not made (NO in S24), the controller 30 confirms whether or not a reservation from the connection processor 13 is made (S26). If the reservation is made (YES in S27), the controller 30 selects a reservation of connection processing by the connection processor 13 (S28). If the reservation by the connection processor 13 is not made (NO in S27), the controller 30 selects a reservation of a NULL packet transmission by the controller 36 (S29). Specifically, the reservation of the NULL packet transmission by the controller 36 has the lowest execution allowance priority as seen from FIG. 12. Thus, the controller 30 allows the execution timing in the case where no reservation is made in the same slot with respect to the NULL packet transmission to the slave 3 reserved from the controller 36. Namely, In FIG. 14, when the controller 30 determines that the reservation does not overlap in the reservation acceptor 32 (NO in S13), the NULL packet transmission to the slave 3 by the controller 36 is allowed (S17 in FIG. 14).

<Example of Communication Method>

A method of selecting a reservation by the controller 30 will be described in detail with reference to FIGS. 16A to 16D.

FIG. 16A is a timing chart showing a desired data exchange between the master 1 and the slave 2. Specifically, the controller 34 reserves a POLL packet transmission to the slave 2 at slots of SN="0" and SN="14" with respect to the scheduling unit 17. The controller 34 further reserves a NULL packet transmission to the slave 2 at slots of SN="2", "4" and SN="6". FIG. 16B is a timing chart showing a desired data exchange between the master 1 and the slave 3. Specifically, the controller 36 reserves a POLL packet transmission to the slave 3 at slots of SN="10" and SN="24" with respect to the scheduling unit 17. The controller 36 further reserves a NULL packet transmission to the slave 3 at slots of SN="12" to "22" and SN="26". FIG. 16C is a timing chart showing a desired operation by the connection processor 13. Specifically, at least any one of inquiry processor 19, inquiry scan unit 20, page processor 21 and page scan unit 22 reserves a connection processing in slots SN="0" to SN "21". FIG. 16D shows a state of processings actually allowed and executed by the controller 30.

For simplification of explanation, a packet length of data transferred from slaves 2 and 3 to the master 1 shown in FIG. 16 is set as "1", that is, DH1.

<Case 0>

The case of SN="0" will be described as a case 0. As shown in FIG. 16, according to the case 0, a POLL packet transmission to the slave 2 and connection processing are reserved in the same slot. Thus, the controller 30 selects a reservation of the POLL packet transmission with respect to the slave 2 (YES in step S21 of FIG. 15). As a result, at the slot SN="0", the POLL packet is transmitted from the master 1 to the slave 2 (see FIG. 16D).

<Case 1>

The case of slots SN="2" to "6" will be described as the case 1. As illustrated in FIG. 16, according to the case 1, a NULL packet transmission to the slave 2 and connection processing are reserved in the same slot. Thus, the controller 30 selects a reservation of the POLL packet transmission with respect to the slave 2 (YES in step S24 of FIG. 15). As a result, at the slots SN="2" to "6", the NULL packet is transmitted from the master 1 to the slave 2 (see FIG. 16D).

<Case 2>

The case of slots SN="8" and "9" will be described as the case 2. As depicted in FIG. 16, according to the case 2, a connection processing by the connection processor 13 is reserved. Thus, the controller 30 selects a reservation of the connection processing with respect to the connection processor 13 (NO in step S13 of FIG. 14). As a result, at the slots SN="8" and "9", the connection processing of the master 1 is executed the connection processor 13 (see FIG. 16D). In other words, IQ packet, FHS packet and ID packet are transmitted and received.

<Case 3>

The case of SN="10" will be described as a case 3. As seen from in FIG. 16, according to the case 3, a POLL packet transmission to the slave 3 and connection processing are reserved in the same slot. Thus, the controller 30 selects a reservation of the POLL packet transmission with respect to the slave 3 (YES in step S21 of FIG. 15). As a result, at the slot SN="10", the POLL packet is transmitted from the master 1 to the slave 3 (see FIG. 16D).

<Case 4>

The case of slots SN="12", "13" and SN="16" to "21" will be described as the case 4. As shown in FIG. 16, according to the case 4, a NULL packet transmission to the slave 3 and connection processing are reserved in the same slot. Thus, the controller 30 selects a reservation of the connection processing with respect to the connection processor 13 (YES in step S27 of FIG. 15). As a result, at the slots SN="12", "13" and SN="16" to "21", the connection processing of the master 1 is executed by the connection processor 13 (see FIG. 16D).

<Case 5>

The case of SN="14" will be described as the case 5. As illustrated in FIG. 16, according to the case 5, a POLL packet transmission to the slave 2, a NULL packet transmission to the slave 3 and connection processing are reserved in the same slot. Thus, the controller 30 selects a reservation of the POLL packet transmission with respect to the slave 2 (YES in step S21 of FIG. 15). As a result, at the slot SN="14", the POLL packet is transmitted from the master 1 to the slave 2 (see FIG. 16D).

<Case 6>

The case of SN="22" to "26" will be described as the case 6. As illustrated in FIG. 16, according to the case 6, a POLL packet transmission to the slave 3, a NULL packet transmission to the slave 3 are reserved. Thus, at the slots SN="22" and "26", the controller 30 selects a reservation of the NULL packet transmission of slave 3 with respect to the controller 36 (NO in step S13 of FIG. 14). At the slot SN="24", the controller 30 selects a reservation of a POLL packet transmission to the slave 3 (NO in step S13 of FIG. 14). As a result, at the slots SN="22" to "26", the POLL and NULL packets are transmitted from the master 1 to the slave 3 (see FIG. 16D).

<Effect>

As described above, the wireless communication apparatus and method obtain the following effects.

(1) Effective Data Transfer is Possible

According to the wireless communication apparatus and method of this embodiment, streaming data requiring real-time characteristic is transferred without shortening TPOLL. Because, according to this embodiment, the NULL packet transmission is allowed to further receive data from the slave 2 rather than allowing the execution of connection processing after the POLL packet transmission to the slave 2.

Specifically, when the controller 34 determines that there is a need of data transfer from the slave 2, the streaming data transceiver 16 can transmit the NULL packet to the slave 2. This results from the following reason as described before. Namely, the POLL and NULL packet transmissions to the slave 2 have an allowance priority higher than connection processing by the connection processor 13 and the NULL packet transmission to the slave 3. Therefore, the foregoing advantage is effective for the next data transfer for example, the following cases. One is the case where the master 1 fails reception of a DH packet due to a change for the worse of the transmission line condition during data transfer from the slave 2. Another is the case where the slave 2 transfers aggregated DH3 and DH5 packets at a high transfer rate; for this reason, the master 1 cannot normally receive a packet equivalent to the after stage of the DH3 and DH5 packets. Even if the foregoing cases are given, the next data transfer is used, and thereby, data is retransmitted if data transfer is further required. As seen from the foregoing description, the NULL packet transmission to the slave 2 has the priority higher than the allowance of connection processing. Therefore, it is possible to execute data transfer of streaming data requiring real-time characteristic without shortening the TPOLL.

Usually, the MTU value of the slave 2 including audio data is larger than a packet size exchanged according to the Bluetooth standard. For this reason, the size of the packet is divided into a packet size conformable to the Bluetooth standard. Even if the MTU value of the slave 2 is the same as the packet size exchanged according to the Bluetooth standard, there is the case where the MTU value of the slave 2 is larger than that of the master 1. Even if the foregoing case is given, the priority rank is given; therefore, the foregoing next data transfer is an effective method.

In addition, according to the wireless communication apparatus and method of this embodiment, data transfer is effectively carried out in the following manner. Namely, data transfer of connection processing by the connection processor 13 and non-streaming data such as character data are carried out while data transfer of streaming data is carried out. Because, according to this embodiment, the TPOLL can take sufficiently longer. Thus, when data transfer from the slave 2 ends in the TPOLL, connection processing and NULL packet transmission to the slave 3 holding non-streaming data are possible in the remaining slots. In other words, a chance of connection processing and NULL packet transmission to the slave 3 is given.

The foregoing effect will be hereinafter described in detail while making a comparison with a conventional communication method. FIGS. 17A to 17D are timing charts showing a state of data communication in a conventional Bluetooth communication apparatus.

FIG. 17A is a timing chart showing a desired data exchange between the master 1 and the slave 2. Specifically, the controller 34 reserves a POLL packet transmission to the slave 2 at slots of SN="0" to SN="26" with respect to the scheduling unit 17. FIG. 17B is a timing chart showing a desired data exchange between the master 1 and the slave 3. Specifically, the controller 36 reserves a POLL packet transmission to the slave 3 at slots of SN="10" and SN="24" with respect to the scheduling unit 17. The controller 36 further reserves a NULL packet transmission to the slave 3 at slots of SN="12" to "22" and SN="26". FIG. 17C is a timing chart showing a desired operation by the connection processor 13. Specifically, at least any one of inquiry processor 19, inquiry scan unit 20, page processor 21 and page scan unit 22 reserves a connection processing in slots SN="0" to SN "21". FIG. 17D shows a state of processings actually allowed and executed by the controller 30. As seen from FIGS. 17A and 17B, the POLL packet transmission to the slave 2 and the POLL packet transmission to the slave 3 are reserved in the same slots, that is, at slots SN="10" and "24". According to the conventional method shown in FIG. 17D, the allowance priority of the POLL packet transmission to the slave 3 is higher than the POLL packet transmission to the slave 2.

According to the conventional method, the streaming data transceiver 16 of the master 1 shown in FIG. 7 estimates that data re-transmission by a change for the worse of the transmission line condition and control data transfer are generated. Thus, the period of the TPOLL must be shortened so that the data processor 23 gives many changes of transmission to the slave 2. For example, in FIG. 17D, the TPOLL value is "2". Therefore, as shown in FIG. 17D, many changes of data transfer to the slave 2 are given. For this reason, even if the transmission line condition is worsened, the master 1 makes a request of data re-transmission to the slave 2, and thereby, streaming is possible. However, the TPOLL is short; for this reason, a change of non-streaming data transfer and connection processing is reduced as seen from FIG. 17D.

Concerning the foregoing point, it is seemed that a change of connection processing is reduced in this embodiment resulting from the following point. Namely, even if real-time characteristic is maintained in streaming data, the NULL packet transmission to the slave 2 holding streaming data is preferentially carried out. However, according to the wireless communication apparatus and method of this embodiment, a NULL packet transmission for receiving the next data from the slave 2 is carried out only when it is determined that it is necessary, as described above. In other words, if it is determined that there is no reservation of the next data transfer from the slave 2, the NULL packet is not transmitted. Therefore, according to this embodiment, the TPOLL is longer than the conventional method. As a result, if it is determined that there is no next data transfer, a chance of executing connection processing becomes much using extra slots.

In this way, connection processing and data transfer of non-streaming data are realized while data transfer of streaming data is carried out without shortening the period of TPOLL.

(2) Operation Reliability is Improved

In particular, when the master 1 receives the next data from the slave 2, it is possible to add control data to the next data in addition to streaming data. Specifically, when the master 1 receives streaming data from the slave 2, it is possible to interrupt and transfer required control data according to communications in the Piconet.

The foregoing control data is a data packet including information on the use inhibition band as described above. Of course, the control data may include system information required for realizing communications between the master 1 and slaves 2, 3, in addition to information on the use inhibition band.

According to the embodiment of the present invention, there is provided a wireless communication method comprising:

causing a first wireless terminal (slave 2) making a Bluetooth communication to set a data transfer allowable period (TPOLL) to a second wireless terminal (master 1) having a control function with respect to the first wireless terminal;

causing the second wireless terminal (master 1) to transmit a first control packet (POLL packet) for receiving a first data packet (DH1 packet) from the first wireless terminal referring to a priority table holding a transmission priority rank for each kind (POLL packet, NULL packet, packet for search and connection) of the packet with respect to a packet to be transmitted to the first wireless terminal (slave 2) within the data transfer allowable period (TPOLL);

causing the first wireless terminal (slave 2) to transmit the first data packet (DH1 packet) to the second wireless terminal (master 1) in response to the first control packet (POLL packet);

causing the second wireless terminal (master 1) to further transmit a second control packet (next DH1 packet) for receiving a second data packet (NULL packet) to the first wireless terminal (slave 2) according to the priority table after receiving the first data packet (DH1 packet);

causing the second wireless terminal (master 1) to search a third wireless terminal (slave having a Bluetooth function) according to the priority table after the reception of the second data packet (next DH1 packet) from the first wireless terminal (slave 2) ends;

causing the second wireless terminal (master 1) to transmit the first control packet (POLL packet) to the first wireless terminal (slave 2);

causing the first wireless terminal (slave 2) to transmit the first data packet (DH1 packet) to the second wireless terminal (master 1);

causing the second wireless terminal (master 1) to transmit the second control packet (NULL packet) to the first wireless terminal (slave 2); and searching a third wireless terminal (slave having a Bluetooth function) by the second wireless terminal (master 1) being carried out within the same data transfer allowable period (TPOLL) after the reception of the second data packet (next DH1 packet) ends.

Namely, in the foregoing method, the data transfer allowable period is a period where the master 1 has the chance of continuously transmitting data to the slave 2. A second step of transmitting the first control packet, a third step of transmitting the data packet, a fourth step of transmitting the second control packet and a fifth step of searching the third wireless terminal are carried out within the same data transfer allowable period.

The present embodiment is not limited to the foregoing one embodiment. For example, according to the foregoing embodiment, Bluetooth communications are given as an example. In this case, the present invention is applicable to a general communication method of dividing a continuous transmission period such as TPOLL into sections such as slot to make communications. In addition, the priority rank is given to a packet to be transmitted; therefore, for example, the present invention is applicable to other wireless communication method such as wireless LAN.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication method comprising:
causing a second wireless terminal having a control function with respect to a first wireless terminal to transmit a first control packet to the first wireless terminal referring to a priority table holding a transmission priority order for each kind of the packet to be transmitted to the first wireless terminal, the first control packet being a packet for receiving a first data packet from the first wireless terminal making Bluetooth communications;

causing the first wireless terminal to transmit the first data packet to the second wireless terminal in response to the first control packet;

causing the second wireless terminal to further transmit a second control packet for receiving a second data packet to the first wireless terminal according to the priority table after receiving the first data packet; and causing the second wireless terminal to search a third wireless terminal according to the priority table after the reception of the second data packet from the first wireless terminal ends;

wherein the transmitting the first control packet includes:
reserving a transmission of the first control packet;
confirming whether or not a reservation except the first control packet is made at the same time;
referring to the priority table when the reservation is made;
selecting the reservation having the highest priority in the priority table; and
allowing an execution of a reservation when the reservation of transmitting the first control packet is selected, and the transmitting the second control packet includes:
reserving a transmission of the second control packet;
confirming whether or not a reservation except the second control packet is made at the same time;
referring to the priority table when the reservation is made;
selecting the reservation having the highest priority in the priority table; and
allowing an execution of a reservation when the reservation of transmitting the second control packet is selected.

2. The method according to claim 1, further comprising:
causing the second wireless terminal to transmit a third control packet for receiving a third data packet to a fourth wireless terminal; and
causing the second wireless terminal to transmit a fourth control packet for receiving a fourth data packet to the fourth wireless terminal when the reservations of transmitting the first and second control packets and a reservation of the search are not made after receiving the third data packet,
wherein an execution of the reservation of transmission of the first control packet is preferentially allowed compared with an execution of the reservation of transmission of the second and fourth control packets and an execution of the reservation of search.

3. The method according to claim 2, wherein the first and second data packets are streaming data, and the third and fourth data packets are non-streaming data.

4. The method according to claim 2, wherein the transmitting the third packet includes:
reserving a transmission of the third control packet;
confirming whether or not a reservation except the third control packet is made at the same time;
referring to the priority table when a reservation is made;
selecting the reservation having the highest priority in the priority table; and
allowing an execution of a reservation when the reservation of transmitting the third control packet is selected, and
an execution of transmission of the third control packet has a priority high than an execution of transmission of the second and fourth control packets and an execution of the reservation of search.

5. The method according to claim 2, wherein the first wireless terminal is an audio reproduction terminal, and the fourth wireless terminal is a character output terminal.

6. The method according to claim 1, wherein the first and second wireless terminals use control data to recognize each other, and change a frequency band from 2.402 GHz to 2.48

GHz for each 625 μsecond to make an exchange of the first and second control packets and the data packet.

7. A wireless communication apparatus which is capable of communicating with a first wireless terminal holding a first data packet by Bluetooth, comprising:
a search unit reserving a search of a second wireless terminal different from the first wireless terminal, and executing the search when the reservation is allowed;
a first transceiver transmitting the first and second control packets to the first wireless terminal, and receiving the first data packet and a second data packet following the first data packet from the first wireless terminal, the first data packet transmitted from the first transceiver giving a notification of a transfer start of the first data packet, the second control packet giving a notification of a transfer start of the second data packet;
a first controller reserving a transmission of the second control packet to the first wireless terminal, the first controller giving instructions to transmit the second control packet to the first transceiver when the transmission of the second control packet is allowed; and
a scheduling unit accepting the reservation from the first controller and the search unit, the scheduling unit preferentially allowing a transmission of the second control packet compared with the search, and allowing the search when no reservation of the transmission of the second control packet is made;
wherein the scheduling unit includes:
a reservation acceptor accepting the reservation from the search unit and the first controller;
a priority table holding a priority rank for allowing a plurality of different reservations; and
a second controller referring to the priority table to select any one reservation having a higher priority, the second controller allowing an execution of the reservation at an execution timing of the selected reservation.

8. The apparatus according to claim 7, further comprising:
a second transceiver transmitting third and fourth control packets to a third wireless terminal, and receiving a third data packet and a fourth data packet following the third data packet from the third wireless terminal; and
a third controller reserving a transmission of the fourth control packet to the third wireless terminal, wherein the third control packet gives a notification of a transfer start of the third data packet, and the fourth control packet gives a notification of a transfer start of the fourth data packet,
the third controller gives instructions to transmit the fourth control packet to the second transceiver when a transmission of the fourth control packet is allowed,
the first controller reserves a transmission of the first control packet to the first wireless terminal, and gives instructions to transmit the first control packet to the first transceiver when the transmission of the first control packet is allowed, and
the scheduling unit preferentially allows an execution of the reservation of transmission of the first control packet compared with an execution of the reservation of transmission of the second and fourth control packets and an execution of the reservation of the search, and allows an execution of the reservation of the fourth control packet when neither reservation of transmitting the first and second control packets nor reservation of the search is made.

9. The apparatus according to claim 8, wherein the first and second data packets are streaming data, and the third and fourth data packets are non-streaming data.

10. The apparatus according to claim 8, wherein an execution of transmission of the third control packet has a priority high than an execution of transmission of the second and fourth control packets and an execution of the reservation of search.

11. The apparatus according to claim 8, wherein the first wireless terminal is an audio reproduction terminal, and the fourth wireless terminal is a character output terminal.

12. The apparatus according to claim 7, wherein the first and second wireless terminals use control data to recognize each other, and change a frequency band from 2.402 GHz to 2.48 GHz for each 625 μsecond to make an exchange of the first and second control packets and the data packet.

13. A wireless communication method comprising:
causing a first wireless terminal making a Bluetooth communication to set a data transfer allowable period to a second wireless terminal having a control function with respect to the first wireless terminal;
causing the second wireless terminal to transmit a first control packet for receiving a first data packet from the first wireless terminal referring to a priority table holding a transmission priority rank for each kind of the packet with respect to a packet to be transmitted to the first wireless terminal within the data transfer allowable period;
causing the first wireless terminal to transmit the first data packet to the second wireless terminal in response to the first control packet;
causing the second wireless terminal to further transmit a second control packet for receiving a second data packet to the first wireless terminal according to the priority table after receiving the first data packet; and
causing the second wireless terminal to search a third wireless terminal according to the priority table after the reception of the second data packet from the first wireless terminal ends,
transmission of the first and second control packets and search of the third wireless terminal being carried out within the same data transfer allowable period;
wherein the transmitting the first control packet includes:
reserving a transmission of the first control packet;
confirming whether or not a reservation except the first control packet is made at the same time;
referring to the priority table when the reservation is made;
selecting the reservation having the highest priority in the priority table; and
allowing an execution of a reservation when the reservation of transmitting the first control packet is selected, and
the transmitting the second control packet includes:
reserving a transmission of the second control packet;
confirming whether or not a reservation except the second control packet is made at the same time;
referring to the priority table when the reservation is made;
selecting the reservation having the highest priority in the priority table; and
allowing an execution of a reservation when the reservation of transmitting the second control packet is selected.

14. The method according to claim 13, further comprising:
causing the second wireless terminal to transmit a third control packet for receiving a third data packet from a fourth wireless terminal to a fourth wireless terminal; and
causing the second wireless terminal to transmit a fourth control packet for receiving a fourth data packet to the fourth wireless terminal when the reservations of transmitting the first and second control packets and a reservation of the search are not made after receiving the third data packet, wherein an execution of the reservation of transmission of the first control packet is preferentially allowed compared with an execution of the reservation of transmission of the second and fourth control packets and an execution of the reservation of search.

15. The method according to claim 14, wherein the first and second data packets are streaming data, and the third and fourth data packets are non-streaming data.

16. The method according to claim 14, wherein the transmitting the third packet includes:

reserving a transmission of the third control packet;
confirming whether or not a reservation except the third control packet is made at the same time;
referring to the priority table when a reservation is made;
selecting the reservation having the highest priority in the priority table; and
allowing an execution of a reservation when the reservation of transmitting the third control packet is selected, an execution of transmission of the third control packet has a priority high than an execution of transmission of the second and fourth control packets and an execution of the reservation of search.

17. The method according to claim 13, wherein the first and second wireless terminals use control data to recognize each other, and change a frequency band from 2.402 GHz to 2.48 GHz for each 625 μsecond to make an exchange of the first and second control packets and the data packet.

* * * * *